United States Patent
Atobe

(10) Patent No.: US 9,715,427 B2
(45) Date of Patent: Jul. 25, 2017

(54) MEMORY CONTROL APPARATUS

(71) Applicant: Hiroshi Atobe, Tokyo (JP)

(72) Inventor: Hiroshi Atobe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 82 days.

(21) Appl. No.: 14/423,841

(22) PCT Filed: Nov. 5, 2012

(86) PCT No.: PCT/JP2012/078628
§ 371 (c)(1),
(2) Date: Feb. 25, 2015

(87) PCT Pub. No.: WO2014/068789
PCT Pub. Date: May 8, 2014

(65) Prior Publication Data
US 2015/0186208 A1   Jul. 2, 2015

(51) Int. Cl.
*G06F 11/10* (2006.01)
*G06F 12/0802* (2016.01)
*G06F 11/32* (2006.01)

(52) U.S. Cl.
CPC ...... *G06F 11/1028* (2013.01); *G06F 11/1016* (2013.01); *G06F 11/1048* (2013.01); *G06F 12/0802* (2013.01); *Y02B 60/1225* (2013.01)

(58) Field of Classification Search
CPC ............. G06F 11/1028; G06F 11/1016; G06F 11/1048; G06F 12/0802; Y02B 60/1225
See application file for complete search history.

(56) References Cited

U.S. PATENT DOCUMENTS 6,295,596 B1   9/2001   Hirabayashi et al.
7,451,261 B2   11/2008   Saito et al.
(Continued)

FOREIGN PATENT DOCUMENTS

CN   101681304 A   3/2010
CN   102754089 A   10/2012
(Continued)

OTHER PUBLICATIONS

International Search Report issued Dec. 18, 2012, in PCT/JP12/078628 filed Nov. 5, 2012.
(Continued)

*Primary Examiner* — Cynthia Britt
*Assistant Examiner* — Dipakkumar Gandhi
(74) *Attorney, Agent, or Firm* — Oblon, McClelland, Maier & Neustadt, L.L.P.

(57) ABSTRACT

An internal buffer caches data from a memory. A memory address conversion unit receives as input a read request from a request source. A hit determination unit determines whether or not data of any one of two or more read out candidate addresses in which payload data requested by the read request and corresponding are stored has been cached or is going to be cached in the internal buffer. When data of any one of the addresses has been cached or is going to be cached in the internal buffer, a command issue interval control unit outputs to the memory a partial read command to instruct to read data from an address other than the address of the data that has been cached or is going to be cached in the internal buffer out of the read out candidate addresses, after a predetermined delay time has elapsed.

20 Claims, 14 Drawing Sheets

(56) References Cited

U.S. PATENT DOCUMENTS

| | | | |
|---|---|---|---|
| 8,214,600 B2 | 7/2012 | Fields, Jr. et al. | |
| 2002/0087786 A1* | 7/2002 | Burton | G06F 3/0605 |
| | | | 711/112 |
| 2006/0153033 A1* | 7/2006 | Saito | G06F 3/0611 |
| | | | 369/47.33 |
| 2006/0179243 A1* | 8/2006 | Fields, Jr. | G06F 12/0811 |
| | | | 711/141 |
| 2008/0034132 A1 | 2/2008 | Nakatake | |
| 2010/0095068 A1 | 4/2010 | Shimizuno et al. | |
| 2010/0211758 A1 | 8/2010 | Sumiyoshi et al. | |
| 2012/0303915 A1 | 11/2012 | Hioki | |

FOREIGN PATENT DOCUMENTS

| | | |
|---|---|---|
| JP | 03-132852 | 6/1991 |
| JP | 05-088987 | 4/1993 |
| JP | 05-233471 | 9/1993 |
| JP | 07-073114 | 3/1995 |
| JP | 07-146825 | 6/1995 |
| JP | 10-040165 | 2/1998 |
| JP | 11-098462 | 4/1999 |
| JP | 2003-044354 | 2/2003 |
| JP | 2004-038705 | 2/2004 |
| JP | 2008-059565 | 3/2008 |
| JP | 2010-191511 | 9/2010 |
| JP | 2012-137944 | 7/2012 |

OTHER PUBLICATIONS

Combined Chinese Office Action and Search Report issued Dec. 5, 2016 in Chinese Patent Application No. 201280076878.2 (with Partial English language translation and English translation of categories of cited documents).

* cited by examiner

Fig. 1

| address | 3 | 2 | 1 | 0 |
|---|---|---|---|---|
| 0000h | D3 | D2 | D1 | D0 |
| 0004h | D7 | D6 | D5 | D4 |
| 0008h | Db | Da | D9 | D8 |
| 000Ch | Df | De | Dd | Dc |
| 0010h | D13 | D12 | D11 | D10 |
| 0014h | D17 | D16 | D15 | D14 |
| 0018h | D1b | D1a | D19 | D18 |
| 001Ch | D1f | D1e | D1d | D1c |
| 0020h | D23 | D22 | D21 | D20 |
| 0024h | D27 | D26 | D25 | D24 |
| 0028h | D1b | D2a | D29 | D28 |
| 002Ch | D2f | D2e | D2d | D2c |
| 0030h | D33 | D32 | D31 | D30 |
| 0034h | D37 | D36 | D35 | D34 |
| 0038h | D3b | D3a | D39 | D38 |
| 003Ch | D3f | D3e | D3d | D3c |

Fig. 2

| address | 3 | 2 | 1 | 0 |
|---|---|---|---|---|
| 0000h | D3 | D2 | D1 | D0 |
| 0004h | D6 | D5 | D4 | ECC0 |
| 0008h | D9 | D8 | ECC1 | D7 |
| 000Ch | Dc | ECC2 | Db | Da |
| 0010h | ECC3 | Df | De | Dd |
| 0014h | D13 | D12 | D11 | D10 |
| 0018h | D16 | D15 | D14 | ECC4 |
| 001Ch | D19 | D18 | ECC5 | D17 |
| 0020h | D1c | ECC6 | D1b | D1a |
| 0024h | ECC7 | D1f | D1e | D1d |
| 0028h | D23 | D22 | D21 | D20 |
| 002Ch | D26 | D25 | D24 | ECC8 |
| 0030h | D29 | D28 | ECC9 | D27 |
| 0034h | D2c | ECCa | D2b | D2a |
| 0038h | ECCb | D2f | D2e | D2d |
| 003Ch | D33 | D32 | D31 | D30 |
| 0040h | D36 | D35 | D34 | ECCd |
| 0044h | D39 | D38 | ECCe | D37 |
| 0048h | D3c | ECCf | D3b | D3a |
| 004Ch | ECC10 | D3f | D3e | D3d |

MEMORY CONTROL APPARATUS

TECHNICAL FIELD

The present invention relates to a technique for processing a read request for requesting to read out payload data from a memory.

BACKGROUND ART

To improve the reliability of a memory, an ECC (Error Correcting Code) or a parity bit may be added to payload data.

Usually, a memory element is added in a width direction (a horizontal ECC or a horizontal parity) specifically for the added ECC or parity bit.

For example, a memory with a special ×9-bit configuration may be used instead of a memory with a ×8-bit configuration.

However, it is often the case that addition of a memory element or use of a special memory is disadvantageous in cost and leads to difficulty in availability of parts.

As one of solutions, a vertical ECC or a vertical parity (to be described hereinafter as the vertical ECC) may be used, according to which the ECC is stored in a depth direction instead of the width direction, thus eliminating the need for expanding the memory in the width direction.

For example, suppose that the ECC is added according to a vertical ECC method to a memory configuration as illustrated in FIG. 1.

In FIG. 1, four pieces of payload data, each having a data width of 1 byte, are stored in one address.

In the memory configuration of FIG. 1, when 1 byte of the ECC is added for every 4 bytes of payload data according to the vertical ECC, this results in an arrangement of data as illustrated in FIG. 2.

In reading from successive addresses in the memory using the vertical ECC, data of a second read from the memory (second data) is also used in a subsequent read from a succeeding address when the ECC is included.

In a case where a request source of read requests manages the payload data in the arrangement of data of FIG. 1, and the memory manages the payload data and the ECC in the arrangement of data of FIG. 2, when there is a read request for the data of address 0000h of FIG. 1 (D0 through D3), the following data reads are performed.

The data of address 0000h (D0 through D3) and then the data of address 0004h (ECC0 through D6) of FIG. 2 are read out from the memory. Error correction is performed using ECC0 on D0 through D3 that have been read out, and error-corrected D0 through D3 are outputted to the request source.

Further, when there is a read request for the data of address 0004h of FIG. 1 (D4 through D7), the following data reads are performed.

The data of address 0004h (ECC0 through D6) and then the data of address 0008h (D7 through D9) of FIG. 2 are read out from the memory. Error correction is performed using ECC1 on D4 through D7 that have been read out, and error-corrected D4 through D7 are outputted to the request source.

As described above, when the addresses to be read are successive, the second data (in the above example, the data of address 0004h of FIG. 2) needs to be read twice from the memory.

However, it is often the case that a memory access involves an overhead (for example, in DRAM (Dynamic Random Access Memory), operating on the same bank generates a period of inaccessibility). Reading the second data twice causes a loss of performance and is thus inefficient.

Electrical power is consumed in every memory access, so that reading the second data twice results in increased electrical power consumption.

As a technique for data transfer involving a parity check result, there is a technique in which bus control is implemented in successive accesses such that the next read request is not accepted before a parity check result is outputted, thus putting the read request on hold until data transfer after a parity check (for example, Patent Literature 1).

CITATION LIST

Patent Literature

Patent Literature 1: JPH 5-233471 A

SUMMARY OF INVENTION

Technical Problem

The method of Patent Literature 1 has a problem, which is that completion of a single transaction from a read request to a return of read data can be guaranteed without fail, but the method cannot support data transfer to a pipelined memory.

The present invention is conceived in light of the above-described circumstances. The present invention mainly aims to avoid redundant reading out of data, to efficiently use a limited memory area, and to reduce electrical power consumption in memory access, even when a pipelined memory is used.

Solution to Problem

A memory control apparatus according to the present invention is an apparatus that processes with a pipeline method a read request for requesting to read out payload data from a memory having a plurality of addresses each storing data of a predetermined data width, the memory in which error correcting data is set for each payload data of the data width, payload data of the data width and error correcting data being correlated with each other are stored across two adjacent addresses, and data is read out in address units, and the memory control apparatus includes:

a cache area in which data that has been read out from the memory is cached;

a read request input unit that receives as input a read request for requesting to read out payload data of an integral multiple of the data width;

a cache determination unit that determines whether or not data of any one of two or more read out candidate addresses has been cached or is going to be cached in the cache area, the two or more read out candidate addresses being addresses in which are stored requested payload data which is payload data being requested by the read request received as input by the read request input unit, and corresponding error correcting data which is error correcting data used for error correction of the requested payload data; and a command output unit that, when the cache determination unit determines that data of any one of the two or more read out candidate addresses has been cached or is going to be cached in the cache area, outputs to the memory a partial read command to instruct to read out data from an address other than a cache address, after a predetermined delay time has elapsed from timing at which the partial read command can be outputted to the memory, the cache address being an address of the data that has been cached or is going to be cached in the cache area out of the two or more read out candidate addresses.

Advantageous Effects of Invention

According to the present invention, a partial read command to instruct to read out data from an address other than a cache address out of read out candidate addresses is outputted to a memory after a predetermined delay time has elapsed from the timing at which the partial read command can be outputted to the memory.

By using data in a cache area as data of the cache address, it is possible to avoid redundant reading out of data, to efficiently use a limited memory area, and to reduce electrical power consumption in memory access.

By outputting the partial read command to the memory after the delay time has elapsed, it is possible to avoid a collision between an input of the data of the cache address from the cache area and an input of the data of the address other than the cache address from the memory, even when a pipelined memory is used.

BRIEF DESCRIPTION OF DRAWINGS

FIG. 1 is a diagram illustrating an example of an arrangement of data without an ECC according to a first embodiment;

FIG. 2 is a diagram illustrating an example of an arrangement of data with a vertical ECC added according to the first embodiment;

DESCRIPTION OF EMBODIMENTS

In a first embodiment, a memory control apparatus supporting a non-pipelined memory will be described. In a second embodiment and a third embodiment, memory control apparatuses supporting a pipelined memory will be described.

In the memory control apparatus according to the first embodiment, a last time value holding unit and an internal buffer are employed in order to avoid redundant reading of second data.

In the memory control apparatuses according to the second and third embodiments supporting the pipelined memory, a last time value holding unit and an internal buffer are also employed in order to avoid redundant reading of second data.

The last time value holding unit and the internal buffer in each memory control apparatus are used in the same manner in the first to third embodiments. For ease of understanding, therefore, the operation of the memory control apparatus employing a non-pipeline method will be described in the first embodiment.

Based on the operation according to the first embodiment, the operation unique to a pipeline method will be described in the second and third embodiments.

The relation, which is common to the first to third embodiments, between addresses and data in a request source and on the memory will be described.

For example, there is data (D0 through D3f) with an address width and a data width of 4 bytes, as illustrated in FIG. 1.

FIG. 2 illustrates a memory arrangement of a vertical ECC where 1 byte of the ECC is added for every 4 bytes.

In this arrangement, data is followed by the ECC. However, this is an example, and it is only required that the ECC be arranged such that the data and the ECC are placed in two adjacent lines.

For example, "ECC0" may be placed before payload data "D0".

Data allocated to the same address is expandable. For example, the data width may be expanded such that D0 through D3, ECC0, and D4 through D6 are allocated to address 0000h, and D7, ECC1, D8 through Db, ECC2, and Dc are allocated to the next address 0008h.

This case is allowable because some of the payload data and the ECC remain correlated with each other across two adjacent addresses.

First Embodiment

Figure 3:
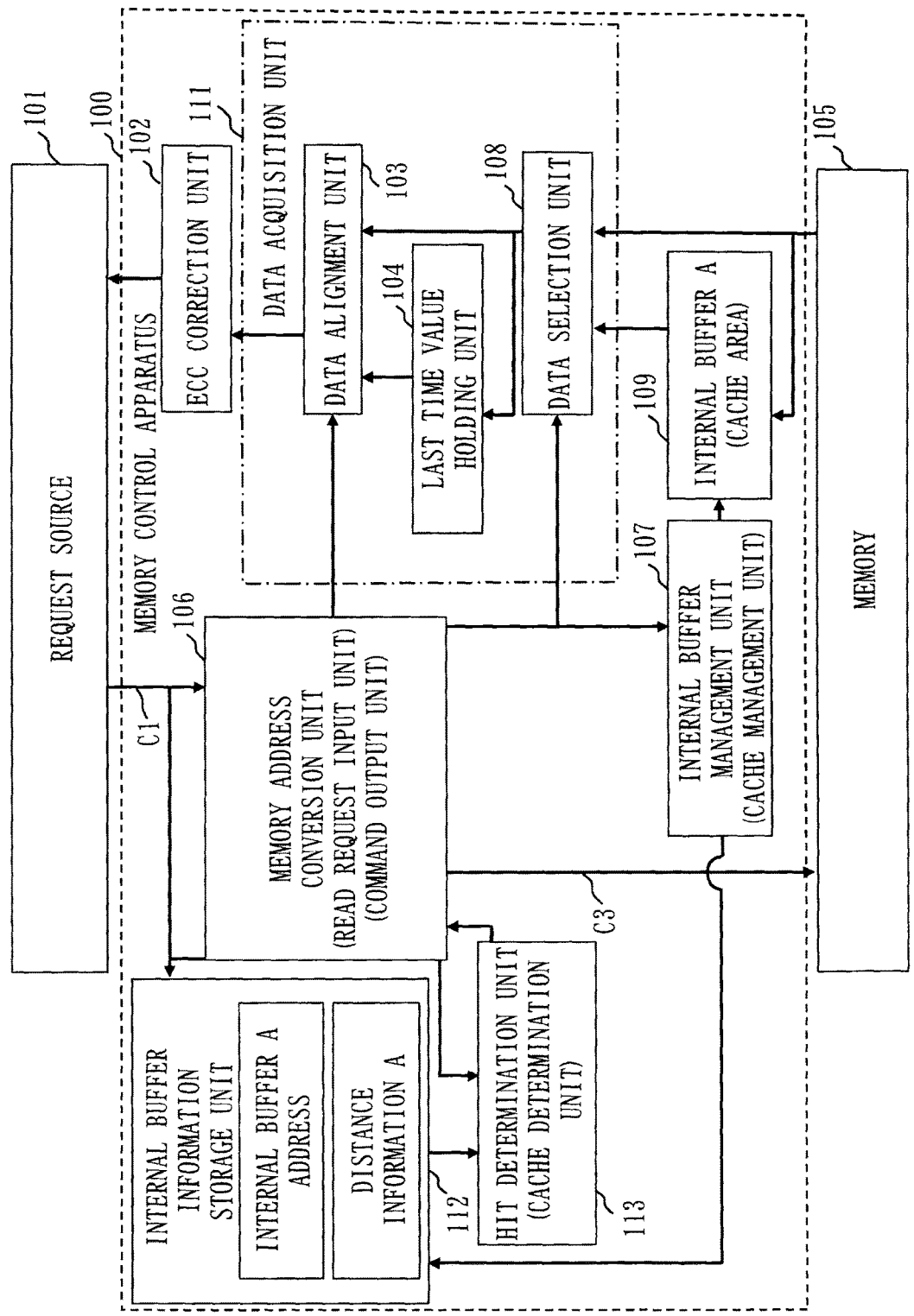
FIG. 3 is a diagram illustrating a memory control apparatus, a request source, and a memory according to the first embodiment.

FIG. 3 illustrates a memory control apparatus 100, a request source 101, and a memory 105 according to the first embodiment.

In FIG. 3, the request source 101 issues a read/write request to the memory 105.

The following description will focus only on a case where the request source 101 issues a read request for requesting to read out payload data from the memory 105.

The request source 101 is, for example, a CPU (Central Processing Unit).

The request source 101 recognizes an arrangement of the payload data in a format illustrated in FIG. 1, for example.

In the memory 105, the payload data and an ECC which is error correcting data are arranged in a format illustrated in FIG. 2, for example.

Data is read out from the memory 105 in address units.

The memory 105 is a memory to be controlled by the memory control apparatus 100.

The memory control apparatus 100 is composed of a memory address conversion unit 106, an internal buffer A 109, an internal buffer management unit 107, an internal buffer information storage unit 112, a hit determination unit 113, a last time value holding unit 104, a data selection unit 108, a data alignment unit 103, and an ECC correction unit 102.

Each component of the memory control apparatus 100 is hardware, for example, such as an element, a device, and a circuit.

Each component of the memory control apparatus 100 is, for example, semiconductor circuits in a chipset.

For example, the memory address conversion unit 106, the internal buffer management unit 107, the internal buffer information storage unit 112, the data selection unit 108, the data alignment unit 103, and the ECC correction unit 102 may be implemented using a program.

The memory address conversion unit 106 receives as input a read request from the request source 101.

The memory address conversion unit 106 converts an address of the inputted read request into an address on the memory 105 where a vertical ECC is arranged.

For example, when the request source 101 issues a read request for the data of address 0000h of FIG. 1 (D1 through D3), the memory address conversion unit 106 performs address conversion into the data of address 0000h (D0 though D3) and the data of address 0004h (ECC0 through D6) of FIG. 2.

The addresses after address conversion by the memory address conversion unit 106 will be referred to as read out candidate addresses (in the above example, address 0000h and address 0004h of FIG. 2 are the read out candidate addresses).

The payload data requested by a read request from the request source 101 will be referred to as requested payload data (in the above example, D0 through D3 are the requested payload data).

The ECC that is used for error correction of the requested payload data will be referred to as corresponding error correcting data or corresponding ECC (in the above example, ECC0 is the corresponding error correcting data).

Further, the memory address conversion unit 106 outputs to the memory 105 a read command to instruct a data read, based on a result of address conversion and a result of determination by the hit determination unit 113.

In the present Specification, information which the memory address conversion unit 106 receives as input from the request source 101 will be referred to as a read request, and information which the memory address conversion unit 106 outputs to the memory 105 will be referred to as a read command.

When a hit is determined in the hit determination unit 113, the memory address conversion unit 106 outputs a partial read command to the memory 105.

The partial read command is a command to instruct to read out data from an address other than an address which has been cached in the internal buffer A 109 (to be referred to as a cache address) out of the read out candidate addresses.

When a miss is determined in the hit determination unit 113, the memory address conversion unit 106 outputs an entire area read command to the memory 105.

The entire area read command is a command to instruct to read out data from the entire area of the read out candidate addresses.

The memory address conversion unit 106 corresponds to an example of a read request input unit and a command output unit.

The internal buffer A 109 stores data that is read from the memory 105 by a previous read command.

The internal buffer A 109 is an example of a cache area.

In FIG. 1, only one internal buffer is illustrated, but a plurality of internal buffers may be arranged.

The internal buffer management unit 107 manages the internal buffer A 109.

More specifically, the internal buffer management unit 107 selects data to be stored in the internal buffer A 109 out of data that is read from the memory 105, and stores the selected data in the internal buffer A 109.

When data which is neither the requested payload data nor the corresponding ECC is included in data at the tail end (to be referred to as the tail end data) of the data that is read out from the memory 105 in response to a read command outputted by the memory address conversion unit 106, the internal buffer management unit 107 stores this tail end data in the internal buffer A 109.

For example, when the request source 101 issues a read request for the data of address 0000h (D0 through D3) of FIG. 1, the memory address conversion unit 106 performs address conversion into the data of address 0000h (D0 through D3) and the data of address 0004h (ECC0 through D6) of FIG. 2.

If the data of address 0000h (D0 through D3) is not stored in the internal buffer A 109, a miss is determined and an entire area read command to instruct to read the data of address 0000h and the data of address 0004h is outputted.

ECC0 through D6 are included in the tail end data (address 0004h) that is read from the memory 105 in response to this entire area read command.

ECC0 is the corresponding ECC, but D4 through D6 are not the requested payload data.

Therefore, the internal buffer management unit 107 stores the data of address 0004h (ECC0 through D6) in the internal buffer A 109.

When the request source 101 issues a read request for the data of address 001Ch of FIG. 1 (D1c through D1f), the memory address conversion unit 106 performs address conversion into the data of address 0020h (D1a through D1c) and the data of address 0024h (D1d through ECC7) of FIG. 2.

If the data of address 0020h (D1a through D1c) is not stored in the internal buffer A 109, a miss is determined and an entire area read command to instruct to read the data of address 0020h and the data of address 0024h is outputted.

D1d through ECC7 are included in the tail end data (address 0024h) that is read from the memory 105 in response to this entire area read command.

D1d through D1f are the requested payload data, and ECC7 is the corresponding ECC.

Therefore, the internal buffer management unit 107 does not store the data of address 0024h (D1d through ECC7) in the internal buffer A 109.

The internal buffer management unit 107 corresponds to an example of a cache management unit.

The hit determination unit 113 determines whether or not data of a part of the read out candidate addresses obtained by the memory address conversion unit 106 has been cached in the internal buffer A 109.

If data of a part of the read out candidate addresses has been cached in the internal buffer A 109, a hit is determined. If not cached, a miss is determined.

The hit determination unit 113 computes a successive address based on an "internal buffer A address" and "distance information A" in the internal buffer information storage unit 112, and determines whether or not the data has been cached in the internal buffer A 109.

If a hit is determined, the hit determination unit 113 outputs a hit signal to the memory address conversion unit 106.

The hit determination unit 113 corresponds to an example of a cache determination unit.

The address (address of FIG. 1) specified by a read request from the request source 101 is stored in the "internal buffer A address" in the internal buffer information storage unit 112.

The address length of the address requested by the read request is stored in the "distance information A" in the internal buffer information storage unit 112.

When the request source 101 issues a read request for address 0000h of FIG. 1, "address 0000h" is stored in the "internal buffer A address" and "4 bytes" is stored in the "distance information A".

When a plurality of internal buffers are present, an address and distance information are stored for each internal buffer.

In FIG. 3, the "internal buffer A address" and the "distance information A" are managed separately. However, only the "internal buffer A address" may be employed.

In this case, a value obtained by adding the address length to the address specified by a read request is stored in the "internal buffer A address".

That is, when the request source 101 issues a read request for address 0000h of FIG. 1, "0004h" which is obtained by adding 4 bytes to address 0000h is stored in the "internal buffer A address".

The last time value holding unit 104 is a register that holds the read data of the last time received from the memory 105 or the data in the internal buffer A 109.

The data selection unit 108 selects either one of the read data received from the memory 105 and the data in the internal buffer A 109, and outputs the selected data to the data alignment unit 103.

The data alignment unit 103 obtains the requested payload data and the corresponding ECC from the data selected by the data selection unit 108 and the data in the last time value holding unit 104, and aligns the obtained requested payload data and corresponding ECC such that ECC correction can be performed.

The data alignment unit 103, the last time value holding unit 104, and the data selection unit 108 will be referred to collectively as a data acquisition unit 111.

The ECC correction unit 102 receives as input from the data alignment unit 103 the requested payload data and the corresponding ECC that have been aligned, performs ECC correction on the requested payload data using the corresponding ECC, and outputs the ECC-corrected requested payload data to the request source 101.

An example of the operation of the memory control apparatus 100 according to this embodiment will now be described with reference to FIG. 1 through FIG. 5.

The following description will be directed to a case where 4 bytes are read from address 0000h of FIG. 1 (D0 through D3), and then 4 bytes are read from address 0004h (D4 through D7).

First, the memory address conversion unit 106 accepts from the request source 101 a read request to read 4 bytes from address 0000h (S201).

Then, the hit determination unit 113 determines whether a hit for the accepted read request can be found in the data stored in the internal buffer A 109 (S301).

Specifically, the hit determination unit 113 makes a determination by computing a cache address based on the "internal buffer A address" and the "distance information A" in the internal buffer information storage unit 112.

At this point, no data is stored in the internal buffer A 109. Accordingly, a result of determination in S301 is NO.

Then, the memory address conversion unit 106 computes an area (read out candidate addresses) including the 4-byte data (D0 through D3) and the corresponding ECC (ECC0), generates a read command to instruct to read from the computed area, and outputs the generated read command to the memory 105 (S202).

With reference to FIG. 2, the above-described data is stored across address 0000h and address 0004h. Accordingly, the memory address conversion unit 106 generates a read command (entire area read command) to instruct to read 8 bytes from address 0000h.

The memory address conversion unit 106 outputs the generated read command to the memory 105, and also outputs the read request from the request source 101 and the read command to the internal buffer management unit 107 and the data selection unit 108.

The memory 105 returns the data of address 0000h (D0 through D3). In the memory control apparatus 100, the data selection unit 108 receives as input the data of address 0000h (S203).

The data selection unit 108 notifies the data alignment unit 103 and the internal buffer management unit 107 that the read data has been inputted.

Upon notification from the data selection unit 108, the internal buffer management unit 107 determines whether the inputted read data is the tail end data (S400).

Since the data of address 0000h is not the tail end data, a result of determination in S401 is NO.

The internal buffer management unit 107 has received as input from the memory address conversion unit 106 the read command and the read request, and recognizes the arrangement of data of FIG. 1 and the arrangement of data of FIG. 2. Thus, the internal buffer management unit 107 can determine that the read data inputted first (data of address 0000h) is not the tail end data.

Since the inputted data of address 0000h is not the tail end data, the inputted read data is not held in the internal buffer A 109.

Then, the data alignment unit 103 determines whether or not data alignment can be performed (S305).

That is, the data alignment unit 103 determines whether the requested payload data requested by the request source 101 and the corresponding ECC can be obtained with the data from the memory 105 or the data in the internal buffer A 109 and the data in the last time value holding unit 104.

At this point, the data of address 0000h has been inputted from the memory 105, but no data is stored in the last time value holding unit 104.

Since the requested payload data and the corresponding ECC cannot be obtained with only the data of address 0000h, the data alignment unit 103 waits for the data of address 0004h to be inputted (NO in S305).

At this time, the read data (address 0000h) is stored as a last time value in the last time value holding unit 104 from the data selection unit 108.

The data alignment unit 103 has received as input from the memory address conversion unit 106 the read command and the read request, and recognizes the arrangement of data of FIG. 1 and the arrangement of data of FIG. 2. Thus, the data alignment unit 103 can determine whether or not data alignment can be performed.

Then, the memory 105 returns the data of address 0004h (ECC0 through D6). In the memory control apparatus 100, the data selection unit 108 receives as input the data of address 0004h (S203).

The data selection unit 108 notifies the data alignment unit 103 and the internal buffer management unit 107 that the read data has been inputted.

Upon notification from the data selection unit 108, the internal buffer management unit 107 determines whether the inputted read data is the tail end data (S400).

The data of address 0004h is the last data that is inputted from the memory 105 in response to the read command, and is thus the tail end data (YES in S400).

Then, the internal buffer management unit 107 determines whether or not succeeding payload data other than the requested payload data and other than the corresponding ECC is included in the inputted data of address 0004h (S401).

The requested payload data requested by the request source 101 is D0 through D3, and the corresponding ECC is ECC0.

D4 through D6 which are succeeding payload data are included in the data of address 0004h.

Accordingly, a result of determination in S401 is YES.

As described above, the internal buffer management unit 107 has received as input from the memory address conversion unit 106 the read request, and recognizes the arrangement of data of FIG. 1 and the arrangement of data of FIG. 2. Thus, the internal buffer management unit 107 can determine that D4 through D6 of address 0004h are succeeding payload data which is neither the requested payload data nor the corresponding ECC.

Then, the internal buffer management unit 107 writes "0000h" in the "internal buffer A address", writes "4" of the 4-byte read in the "distance information A" in the internal buffer information storage unit 112, and stores the data of address 0004h (ECC0 through D6) in the internal buffer A 109 (S402).

Then, the data alignment unit 103 determines whether or not data alignment can be performed (S305).

That is, the data alignment unit 103 determines whether the requested payload data requested by the request source 101 and the corresponding ECC can be obtained with the data from the memory 105 or the data in the internal buffer A 109 and the data in the last time value holding unit 104.

At this point, the data of address 0004h has been inputted from the memory 105, and the data of address 0000h has been stored in the last time value holding unit 104 as the last time value.

Since the requested payload data and the corresponding ECC can be obtained with the data inputted from the memory 105 and the data in the last time value holding unit 104, a result of determination in S305 is YES.

The data alignment unit 103 receives as input the data of address 0000h (D0 through D3) from the last time value holding unit 104, obtains the data of address 0004h (ECC0 through D6) from the data selection unit 108, extracts the requested payload data (D0 through D3) and the corresponding ECC (ECC0), and aligns the extracted data (S205).

Then, the ECC correction unit 102 obtains the aligned data (D0 through D3 and ECC0) from the data alignment unit 103, performs ECC correction on the requested payload data D0 through D3 using ECC0, and then returns the requested payload data D0 through D3 to the request source 101 (S206).

The entirety of the requested payload data has now been returned, and thus the process is completed (S207).

Suppose a case where a read request to read 4 bytes from address 0004h is subsequently accepted from the request source 101.

In this case, after the read request is accepted (S201), the hit determination unit 113 determines whether a hit for the payload data requested by the read request can be found in the data stored in the internal buffer A 109 (S301).

That is, the hit determination unit 113 determines whether the read request accepted in S201 is a request to read data of a successive address of the address written in the "internal buffer A address" in the internal buffer information storage unit 112.

In this example, "address 0000h" is written in the "internal buffer A address", and "4" is written in the "distance information A". Adding 4 bytes to "address 0000h" results in "0004h", which matches the request of the read request. Accordingly, a hit is determined and a result of determination in S301 is YES.

The memory address conversion unit 106 computes an area (read out candidate addresses) including the 4-byte data (D4 through D7) and the corresponding ECC (ECC1).

With reference to FIG. 2, the above-described data is placed across address 0004h and address 0008h. Thus, the memory address conversion unit 106 normally generates a read command to instruct to read 8 bytes from address 0004h.

However, since the data of address 0004h stored in the internal buffer A 109 is used, the memory address conversion unit 106 generates a read command (partial read command) to instruct to read 4 bytes from 0008h, and outputs the generated read command to the memory 105 (S302).

The memory address conversion unit 106 outputs the generated read command to the memory 105, and outputs the read request from the request source 101 and the read command to the internal buffer management unit 107 and the data selection unit 108.

Since the data of address 0004h has already been stored in the internal buffer A, the internal buffer management unit 107 transmits the data in the internal buffer A 109 to the data alignment unit 103 through the data selection unit 108 (S303).

The data alignment unit 103 determines whether or not data alignment can be performed (S305).

That is, the data alignment unit 103 determines whether the requested payload data requested by the request source 101 and the corresponding ECC can be obtained with the data from the memory 105 or the data in the internal buffer A 109 and the data in the last time value holding unit 104.

At this point, the data of address 0004h exists in the internal buffer A 109, and the data of address 0004h also exists in the last time value holding unit 104.

Since the requested payload data and the corresponding ECC cannot be obtained with only the data of address 0004h, the data alignment unit 103 waits for the data of address 0008h to be inputted (NO in S305).

At this time, the data (address 0004h) in the internal buffer A 109 is stored as the last time value in the last time value holding unit 104 from the data selection unit 108.

Then, the memory 105 returns the data of address 0008h (D7 through D9). In the memory control apparatus 100, the data selection unit 108 receives as input the data of address 0008h (S203).

The data selection unit 108 notifies the data alignment unit 103 and the internal buffer management unit 107 that the read data has been inputted.

Upon notification from the data selection unit 108, the internal buffer management unit 107 determines whether the inputted read data is the tail end data (S400).

The data of address 0008h is the last data that is inputted from the memory 105 in response to the read command, and is thus the tail end data (YES in S400).

Then, the internal buffer management unit 107 determines whether or not succeeding payload data other than the requested payload data and other than the corresponding ECC is included in the inputted data of address 0008h (S401).

The requested payload data requested by the request source 101 is D4 through D7, and the corresponding ECC is ECC1.

D8 and D9 which are succeeding payload data are included in the data of address 0008h.

Accordingly, a result of determination in S401 is YES.

Then, the internal buffer management unit 107 writes "0004h" in the "internal buffer A address" and writes "4" of the 4-byte read in the "distance information A" in the internal buffer information storage unit 112, and stores the data of address 0008h (D7 through D9) in the internal buffer A 109 (S402).

Then, the data alignment unit 103 determines whether or not data alignment can be performed (S305).

That is, the data alignment unit 103 determines whether the requested payload data requested by the request source 101 and the corresponding ECC can be obtained with the data from the memory 105 or the data in the internal buffer A 109 and the data in the last time value holding unit 104.

At this point, the data of address 0008h has been inputted from the memory 105, and the data of address 0004h has been stored in the last time value holding unit as the last time value.

Since the requested payload data and the corresponding ECC can be obtained with the data inputted from the memory 105 and the data in the last time value holding unit 104, a result of determination in S305 is YES.

The data alignment unit 103 receives as input from the last time value holding unit 104 the data of address 0004h (ECC0 through D6), obtains the data of address 0008h (D7 through D9) from the data selection unit 108, extracts the requested payload data (D4 through D7) and the corresponding ECC (ECC1), and aligns the extracted data (S205).

Then, the ECC correction unit 102 obtains the aligned data (D4 through D7 and ECC1) from the data alignment unit 103, performs ECC correction on the requested payload data D4 through D7 using ECC1, and then returns the requested payload data D4 through D7 to the request source 101 (S206).

The entirety of the requested payload data has now been returned, and thus the process is completed (S207).

Figure 5:
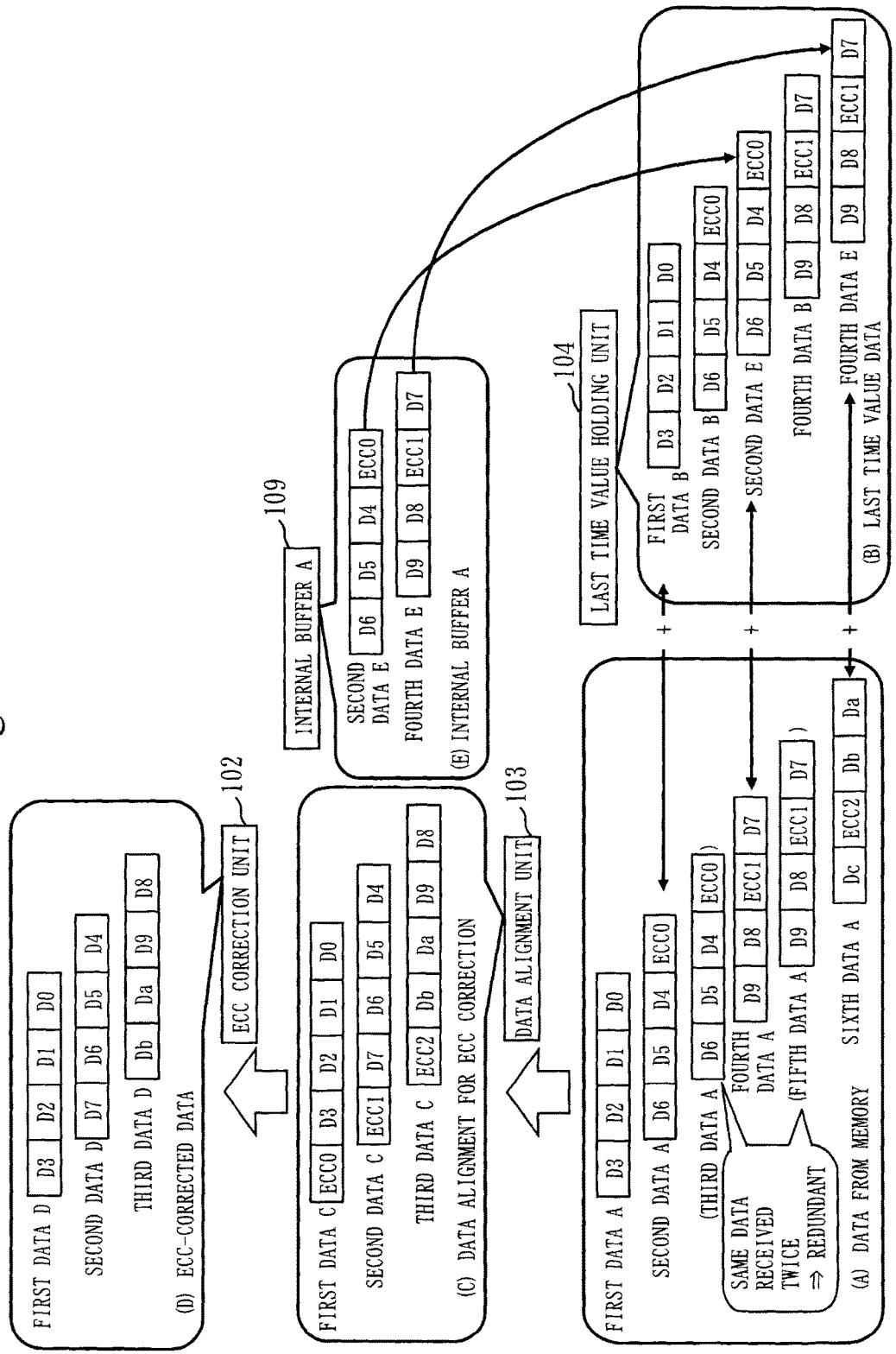
FIG. 5 is a diagram illustrating an example of the operation of the memory control apparatus according to the first embodiment.

FIG. 5 provides a specific description of the operation of the memory control apparatus 100 described above.

When the request source 101 issues a read request to read 4 bytes from address 0000h (FIG. 1) (D0 through D3), first data A (D0 through D3) is read out from address 0000h of FIG. 2 in the memory 105.

Since the first data A (D0 through D3) is not the tail end data, it is not held in the internal buffer A 109, but is held in the last time value holding unit 104 as first data B (D0 through D3).

Then, second data A (ECC0 through D6) is read out from address 0004h of FIG. 2 in the memory 105.

Since the second data A (ECC0 through D6) is the tail end data, it is held in the internal buffer A as second data E (ECC0 through D6).

The data alignment unit 103 performs data alignment with the second data A (ECC0 through D6) from the memory 105 and the first data B (D0 through D3) in the last time value holding unit 104, and thus generates first data C (D0 through ECC0).

Then, the ECC correction unit 102 performs ECC correction on the first data C (D0 through ECC0), and outputs ECC-corrected first data D (D0 through D3) to the request source 101.

The second data A (ECC0 through D6) is held in the last time value holding unit 104 as second data B (ECC0 through D6).

Subsequently, when the request source 101 issues a read request to read 4 bytes from address 0004h (FIG. 1) (D4 through D7), the second data E (ECC0 through D6) exists in the internal buffer A 109, and the second data B (ECC0 through D6) is held in the last time value holding unit 104 as the last time value.

Since data alignment cannot be performed with the second data E (ECC0 through D6) in the internal buffer A 109 and the second data B (ECC0 through D6) in the last time value holding unit 104, the second data E (ECC0 through D6) is held in the last time value holding unit 104 as the last time value, and fourth data A (D7 through D9) is read out from address 0008h of FIG. 2 in the memory 105.

Since the fourth data A (D7 through D9) is the tail end data, it is held in the internal buffer A 109 as fourth data E (D7 through D9).

The data alignment unit 103 performs data alignment with the fourth data A (D7 through D9) from the memory 105 and the second data E (ECC0 through D6) in the last time value holding unit 104, and thus generates second data C (D4 through ECC1).

Then, the ECC correction unit 102 performs ECC correction on the second data C (D4 through ECC1), and outputs ECC-corrected second data D (D4 through D7) to the request source 101.

The fourth data A (D7 through D9) is held in the last time value holding unit 104 as fourth data B (D7 through D9).

In the absence of this embodiment, when the request source 101 issues a read request to read 4 bytes from address 0004h, data ECC0 through D6 will be read out redundantly as illustrated as third data A (ECC0 through D6).

In contrast, according to this embodiment, the second data E (ECC0 through D6) in the internal buffer A 109 can be used, eliminating the need for redundant reading out from the memory 105.

An example of the operation of the memory control apparatus 100 including only the internal buffer A 109 has been described above.

An example of the operation of the memory control apparatus 100 including an internal buffer B 1090 in addition to the internal buffer A 109 will now be described.

Figure 6:
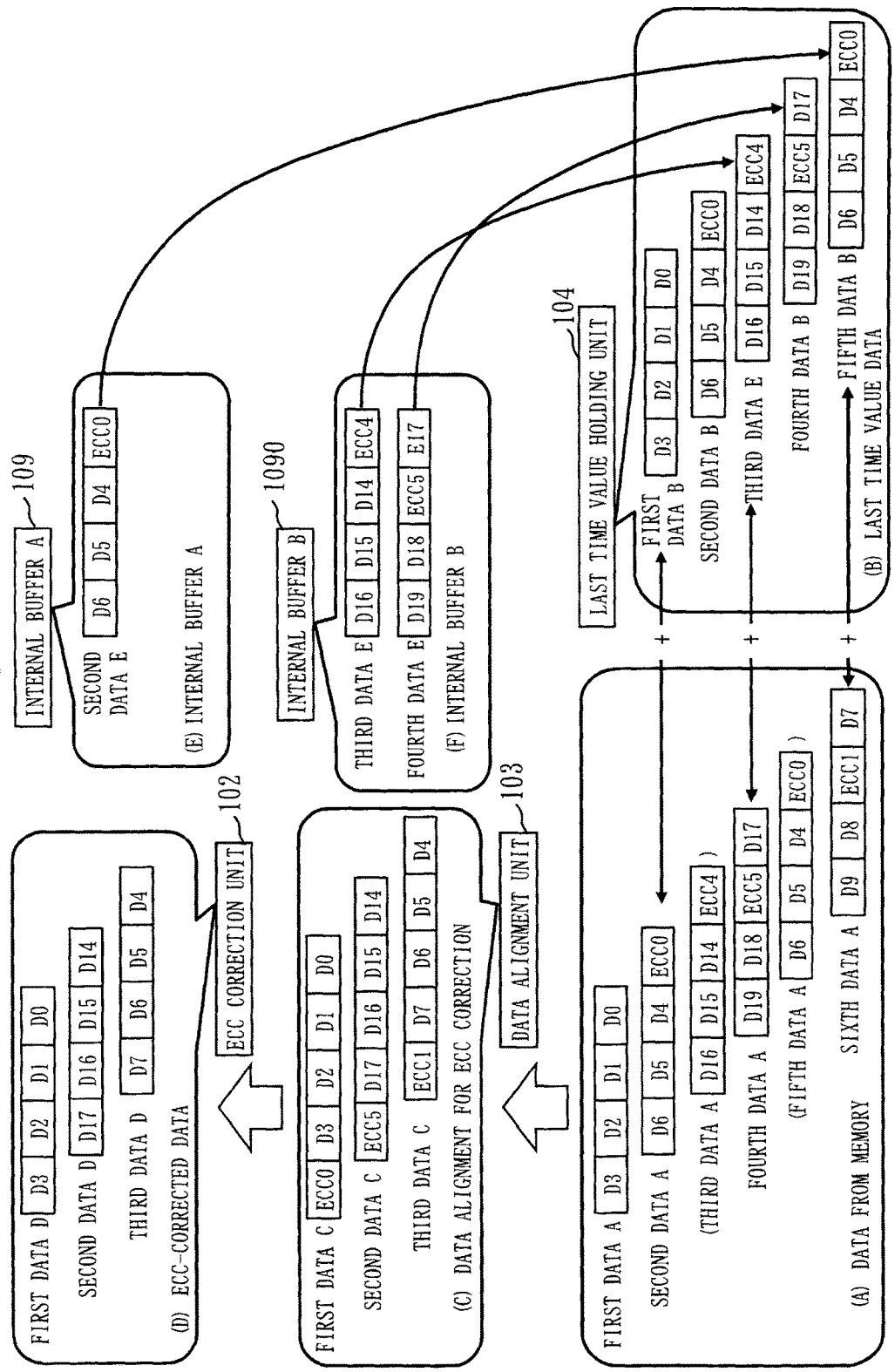
FIG. 6 is a diagram illustrating an example of the operation of the memory control apparatus according to the first embodiment.

FIG. 6 illustrates an example of the operation of the memory control apparatus 100 including the internal buffer A 109 and the internal buffer B 1090.

FIG. 6 illustrates an example of the operation of the memory control apparatus 100 in a case where the request source 101 issues a read request to read 4 bytes from address 0000h (FIG. 1) (D0 through D3), then issues a read request to read 4 bytes from address 0014h (FIG. 1) (D14 through D17), and further issues a read request to read 4 bytes from address 0004h (D4 through D7).

It is assumed that at the time of the first read request (read request for address 0000h), data ECC4 through D16 (address 0018h of FIG. 2) that has been read out in response to a read request preceding the first read request is held in the internal buffer B 1090 as third data E.

On the other hand, it is assumed that at the time of the first read request, no data is held in the internal buffer A 109.

When the request source 101 issues a read request to read 4 bytes from address 0000h (FIG. 1) (D0 through D3), first data A (D0 through D3) is read out from address 0000h of FIG. 2 in the memory 105.

Since the first data A (D0 through D3) is not the tail end data, it is not held in the internal buffer A 109, but is held in the last time value holding unit 104 as first data B (D0 through D3).

Then, second data A (ECC0 through D6) is read out from the memory 105.

Since the second data A (ECC0 through D6) is the tail end data, it is held in the internal buffer A 109 as second data E (ECC0 through D6).

The data alignment unit 103 performs data alignment with the second data A (ECC0 through D6) from the memory 105 and the first data B (D0 through D3) in the last time value holding unit 104, and thus generates first data C (D0 through ECC0).

Then, the ECC correction unit 102 performs ECC correction on the first data C (D0 through ECC0), and outputs ECC-corrected first data D (D0 through D3) to the request source 101.

The second data A (ECC0 through D6) is held in the last time value holding unit 104 as second data B (ECC0 through D6).

Subsequently, when the request source 101 issues a read request to read 4 bytes from address 0014h (FIG. 1) (D14 through D17), the third data E (ECC4 through D16) exists in the internal buffer B 1090, and the second data B (ECC0 through D6) is held in the last time value holding unit 104 as the last time value.

Since data alignment cannot be performed with the third data E (ECC4 through D16) in the internal buffer B 1090 and the second data B (ECC0 through D6) in the last time value holding unit 104, the third data E (ECC4 through D16) is held in the last time value holding unit 104 as third data B (ECC4 through D16) (last time value), and fourth data A (D17 through D19) is read out from address 001Ch of FIG. 2 in the memory 105.

Since the fourth data A (D17 through D19) is the tail end data, it is held in the internal buffer A 109 as fourth data E (D17 through D19).

The data alignment unit 103 performs data alignment with the fourth data A (D17 through D19) from the memory 105 and the third data B (ECC4 through D16) in the last time value holding unit 104, and thus generates second data C (D14 through ECC5).

Then, the ECC correction unit 102 performs ECC correction on the second data C (D14 through ECC5), and outputs ECC-corrected second data D (D14 through D17) to the request source 101.

The fourth data A (D17 through D19) is held in the last time value holding unit 104 as fourth data B (D17 through D19).

Subsequently, when the request source 101 issues a read request to read 4 bytes from address 0004h (FIG. 1) (D4 through D7), the second data E (ECC0 through D6) exists in the internal buffer A 109, and the fourth data B (D17 through D19) is held in the last time value holding unit 104 as the last time value.

Since data alignment cannot be performed with the second data E (ECC0 through D6) in the internal buffer A 109 and the fourth data B (D17 through D19) in the last time value holding unit 104, the second data E (ECC0 through D6) is held in the last time value holding unit 104 as fifth data B (ECC0 through D6) (last time value), and sixth data A (D7 through D9) is read out from address 0008h of FIG. 2 in the memory 105.

Since the sixth data A (D7 through D9) is the tail end data, it is held in the internal buffer A 109 as sixth data E (D7 through D9).

The data alignment unit 103 performs data alignment with the sixth data A (D7 through D9) from the memory 105 and the fifth data B (ECC0 through D6) in the last time value holding unit 104, and thus generates third data C (D4 through ECC1).

Then, the ECC correction unit 102 performs ECC correction on the third data C (D4 through ECC1), and outputs ECC-corrected third data D (D4 through D7) to the request source 101.

The sixth data A (D7 through D9) is held in the last time value holding unit 104 as sixth data B (D7 through D9).

The illustration of the sixth data B (D7 through D9) is omitted.

The above description has been directed to the example where the payload data is returned to the request source 101 in response to read requests in units of 4 bytes, such as 4 bytes from address 0000h and 4 bytes from address 0004h.

The memory control apparatus 100 according to this embodiment is also capable of handling read requests in units of an integral multiple of 4 bytes.

For example, the memory control apparatus 100 is capable of handling read requests in units of 8 bytes, such as 8 bytes from address 0000h and 8 bytes from address 0008h.

In this embodiment, the example has been described where two internal buffers, namely the internal buffer A 109 and the internal buffer B 1090, are employed. The procedure described in this embodiment can also deal with a case where three or more internal buffers are employed.

In this embodiment, a memory control apparatus having the following means has been described:

(a) means to convert a request from a request source into a request for a memory, providing a bridge for data;

(b) means to perform ECC error correction on data;

(c) means to rearrange data that is received from the memory employing a vertical ECC into data that is suitable for ECC error correction (separated into data and a corresponding ECC);

(d) means to convert an address and a length from the request source into an address and a length of the memory employing the vertical ECC;

(e) means to hold last received data from the memory;

(f) means to hold last received read data including payload data of the next address;

(g) means to store an address of the payload data being held, in order to determine the next address;

(h) means to store distance information, in order to determine the next address;

(i) means to determine whether a read command to be issued to the memory is going to reuse the payload data being held; and (j) means to select either of data in an internal buffer and read data received from the memory.

Second Embodiment

Figure 4:
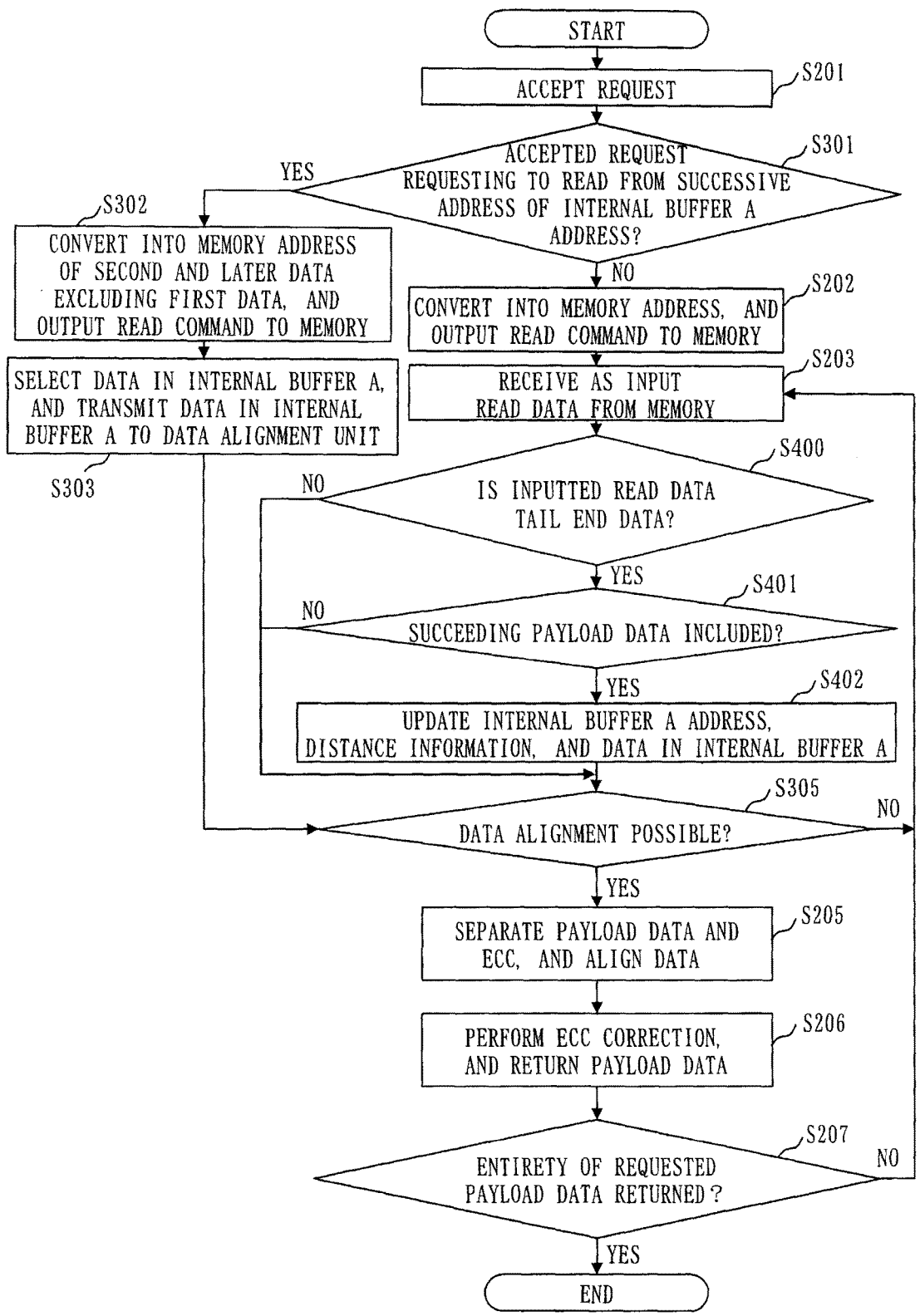
FIG. 4 is a flowchart illustrating an example of the operation of the memory control apparatus according to the first embodiment.

In the first embodiment, non-pipelined operation is performed because, for example, a read request from the request source 101 to read 4 bytes from address 0004h (FIG. 1) is processed after 4 bytes have been read from the preceding address 0000h (FIG. 1) (YES in S207 of FIG. 4).

In pipelined operation, there may be a possibility that at the timing when the data held in the internal buffer is reused, the read data of another transaction is returned from the memory, resulting in a collision between the data in the internal buffer and the data from the memory. If a data collision occurs, either one of the two pieces of data will be lost.

In this embodiment, when the data in the internal buffer is reused in the pipelined operation, the timing at which the read data is received from the memory is delayed in order to prevent overlapping of the timing at which the read data received from the memory is outputted to the data acquisition unit 111 and the timing at which the data from the internal buffer is outputted to the data acquisition unit 111.

In this way, the memory control apparatus 100 according to this embodiment supports the pipelined memory.

The memory control apparatus 100 according to this embodiment can effectively utilize the characteristics of the pipelined memory, contributing to increased memory access throughput.

Figure 7:
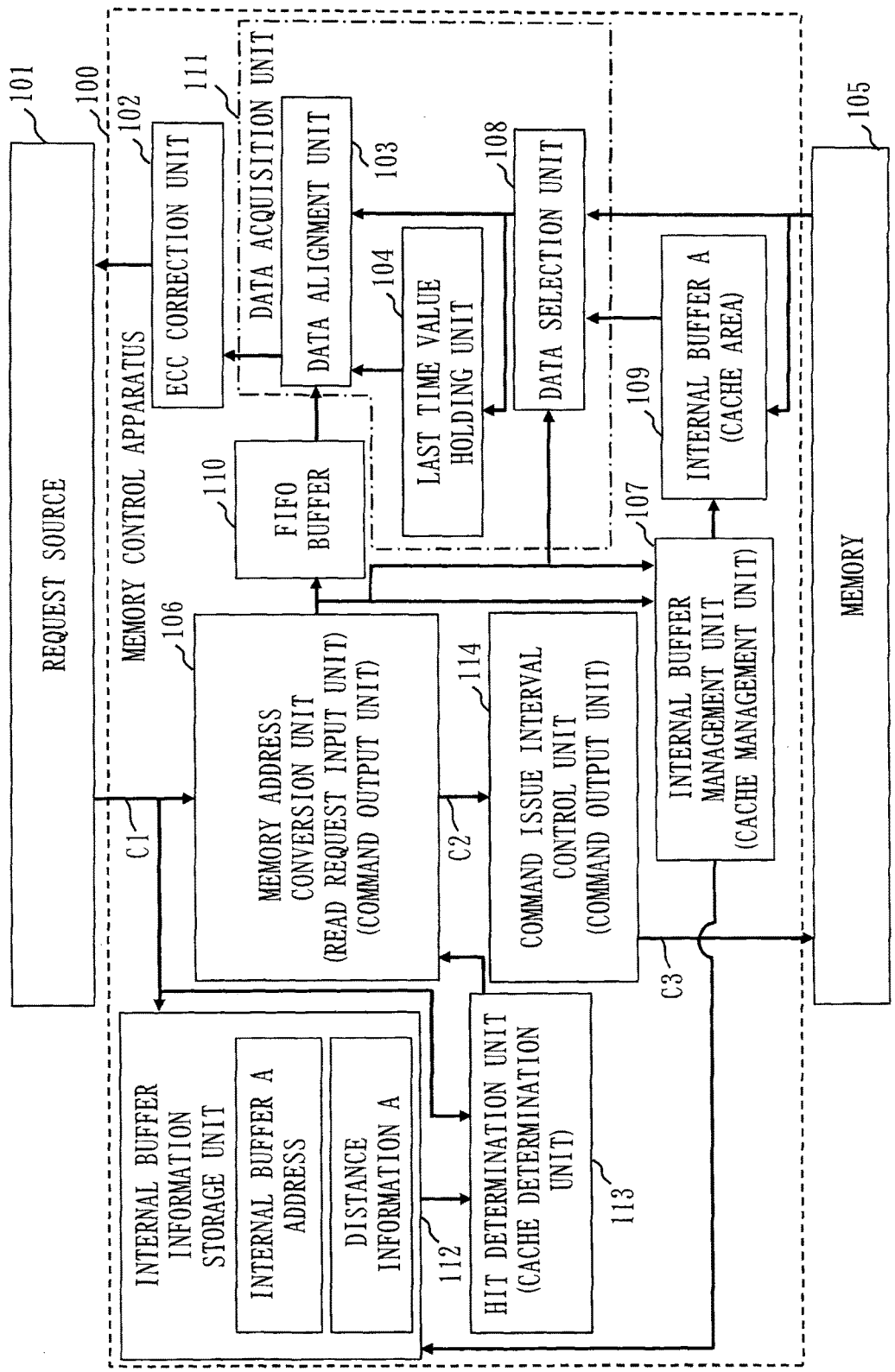
FIG. 7 is a diagram illustrating a memory control apparatus, a request source, and a memory according to a second embodiment.

FIG. 7 illustrates an example of the configuration of the memory control apparatus 100 according to this embodiment.

Compared with the configuration of FIG. 3, a command issue interval control unit 114 and a FIFO buffer 110 are added in FIG. 7.

When the data in the internal buffer A is used, the command issue interval control unit 114 performs control to delay the output of a read command to the memory 105 for a period of time required for using the data in the internal buffer A 109.

When a read command is outputted, read data is returned from the memory 105 after a certain interval (read latency). Thus, by using the command issue interval control unit 114 to control the interval at which read commands are issued, it is possible to secure time to allow for use of the data in the internal buffer A.

A delay time during which the command issue interval control unit 114 delays the output of a read command is, for example, a period of time corresponding to one slot in a pipeline.

In this embodiment, the command issue interval control unit 114 also corresponds to an example of the command output unit.

In this embodiment, the memory address conversion unit 106 stores a read command to the memory 105 in the FIFO buffer 110.

Further, the memory address conversion unit 106 stores in the FIFO buffer 110 an internal buffer data input command (corresponding to a cache data input command) to instruct the data alignment unit 103 to receive as input the data held in the internal buffer A 109, and a memory data input command to instruct the data alignment unit 103 to receive as input the data from the memory 105.

The FIFO buffer 110 stores the read command, the internal buffer data input command, and the memory data input command.

The memory control apparatus 100 according to this embodiment controls the pipelined memory.

That is, the memory control apparatus 100 according to this embodiment accepts the next read request from the request source 101 and issues a read command to the memory 105 before the entirety of the read data in response to a read request accepted from the request source 101 has been returned to the request source 101.

For this reason, an issued read command is stored in the FIFO buffer 110.

In this embodiment, the internal buffer management unit 107 updates the "internal buffer A address" value and the "distance information A" value in the internal buffer information storage unit 112 before the read data is inputted from the memory 105.

For this reason, the hit determination unit 113 not only determines whether or not the data of the address to be read out has been cached in the internal buffer A 109, but also determines whether or not the data of the address to be read out is going to be cached in the internal buffer A 109, based on the "internal buffer A address" value and the "distance information A" value.

Other components illustrated in FIG. 7 are substantially the same as those illustrated in FIG. 3, and thus description thereof will be omitted.

An example of the operation of the memory control apparatus 100 according to this embodiment will now be described with reference to FIG. 8 and FIG. 9.

S201, S301, and S202 are substantially the same as those described in the first embodiment, and thus description thereof will be omitted.

In this embodiment, in S302, the memory address conversion unit 106 generates a read command (partial read command) to instruct to read data not being held in the internal buffer A 109. In S506, the command issue interval control unit 114 outputs the read command (partial read command) to the memory 105 after an interval of time to allow for use of the data in the internal buffer A 109 (time for avoiding a data collision).

The command issue interval control unit 114 outputs the read command to the memory 105 after a predetermined delay time has elapsed from the timing at which the read command is normally outputted after the memory address conversion unit 106 generated the read command.

Then, the internal buffer management unit 107 determines whether or not succeeding payload data is included in the tail end data (S505).

That is, the internal buffer management unit 107 determines whether or not succeeding payload data is included in the tail end data of the data that is read out from the memory 105 in response to the read command generated in S202 or S302.

This process is substantially the same as the process in S401 of FIG. 4.

As in the case of the first embodiment, the internal buffer management unit 107 has received as input from the memory address conversion unit 106 the read request from the request source 101 and the read command to the memory 105, and recognizes the arrangement of data of FIG. 1 and the arrangement of data of FIG. 2. Thus, the internal buffer management unit 107 can determine whether or not succeeding payload data is included in the tail end data, as in S505.

If succeeding payload data is included in the tail end data (YES in S505), the internal buffer management unit 107 updates the "internal buffer A address" value and the "distance information A" value in the internal buffer information storage unit 112 (S507).

Note that the data in the internal buffer A 109 is not updated at this point.

In this embodiment, since operation supporting the pipelined memory is performed, the "internal buffer A address" value and the "distance information A" value in the internal buffer information storage unit 112 are updated before the read data is inputted from the memory 105.

Then, the memory address conversion unit 106 stores commands in the FIFO buffer 110 (S501).

Specifically, if an entire area read command has been generated in S202, the memory address conversion unit 106 generates a memory data input command to instruct the data alignment unit 103 to receive as input the data from the memory 105.

Then, the memory address conversion unit 106 stores the entire area read command, the read request, and the memory data input command in the FIFO buffer 110.

If a partial read command has been generated in S302, the memory address conversion unit 106 generates an internal buffer data input command to instruct the data alignment unit 103 to receive as input the data held in the internal buffer A 109 and a memory data input command.

Then, the memory address conversion unit 106 stores the partial read command, the read request, the internal buffer data input command, and the memory data input command in the FIFO buffer 110.

If a read request is accepted from the request source 101 before the ECC-corrected requested payload data has been completely returned, commands are successively stored in the FIFO buffer.

Figure 8:
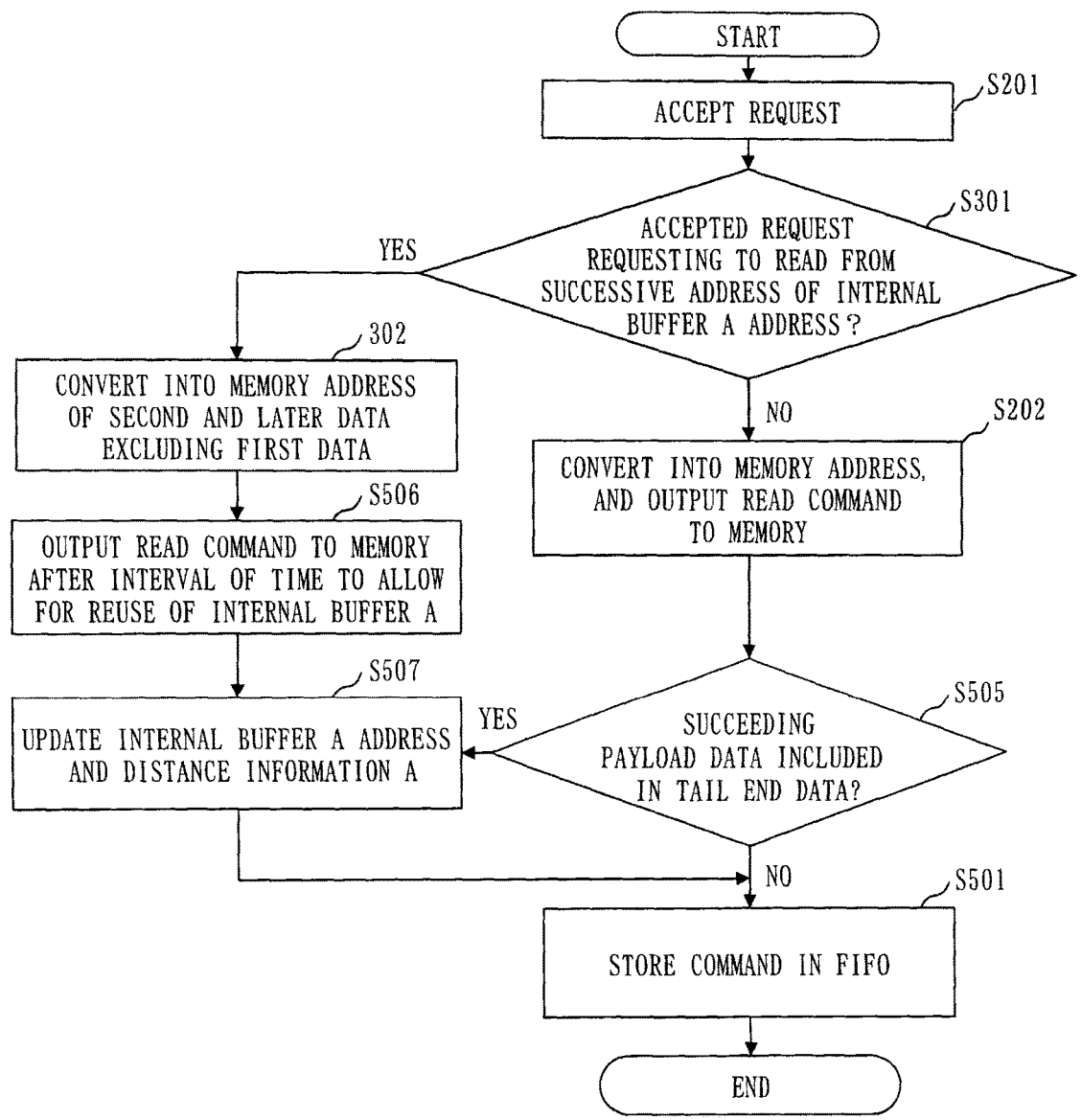
FIG. 8 is a flowchart illustrating an example of the operation of the memory control apparatus according to the second embodiment.

In parallel with the process of FIG. 8, the data alignment unit 103 periodically checks whether commands are accumulated in the FIFO buffer 110 (S502). If a command is present in the FIFO buffer (YES in S502), the data alignment unit 103 takes out the command from the FIFO buffer 110 (S503).

If the command taken out is an internal buffer data input command, S504 is YES and processing proceeds to S303.

If the command taken out is a memory data input command, S504 is NO and processing proceeds to S203.

Figure 9:
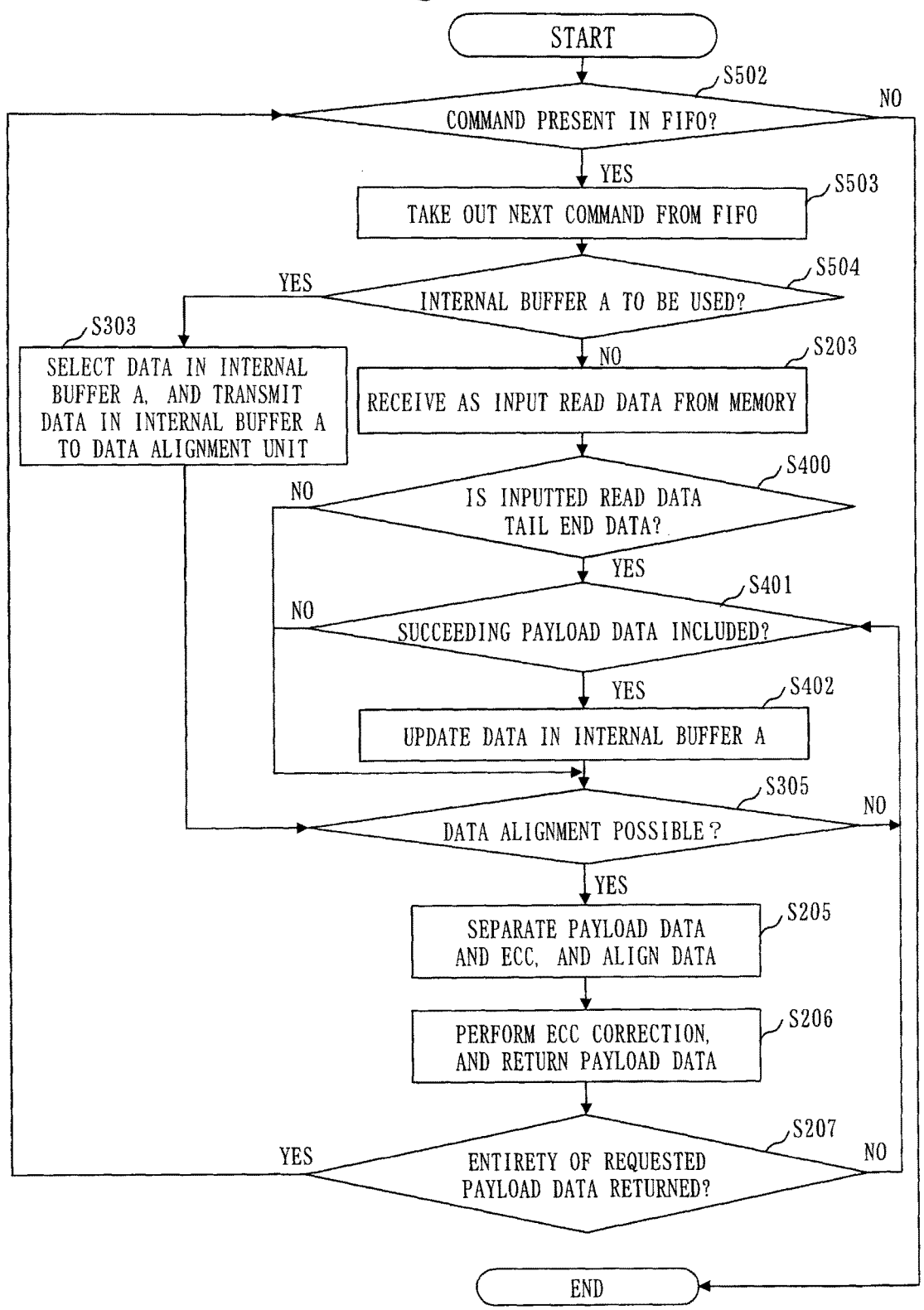
FIG. 9 is a flowchart illustrating an example of the operation of the memory control apparatus according to the second embodiment.

For reasons of illustration, FIG. 9 does not illustrate a process in a case where the command taken out is a read command or a read request. If a read command or a read request is taken out, the data alignment unit 103 holds the read command or read request taken out in a predetermined storage area and takes out another command from the FIFO buffer 110.

In S203, the data selection unit 108 receives as input from the memory 105 the read data, and notifies the internal buffer management unit 107 that the read data has been inputted.

The internal buffer management unit 107 determines whether or not the inputted read data is the tail end data (S400). If the read data is the tail end data, the internal buffer management unit 107 determines whether or not succeeding payload data is included in the tail end data (S401).

If succeeding payload data is included in the tail end data, the internal buffer management unit 107 updates the data in the internal buffer A 109 (S402).

In S303, the internal buffer management unit 107 transmits the data in the internal buffer A 109 to the data alignment unit 103 through the data selection unit 108.

The data alignment unit 103 determines whether or not data alignment can be performed (S305). If data alignment can be performed, the data alignment unit 103 extracts the requested payload data and the corresponding ECC and aligns the extracted data (S205).

Further, the ECC correction unit 102 obtains the aligned data from the data alignment unit 103, performs ECC correction on the requested payload data using the ECC data, and then returns the requested payload data to the request source 101 (S206).

The process is completed when the entirety of the requested payload data has been returned (S207).

The operation in each of S203, S400, S401, S402, S305, S205, S206, and S207 is the same as that described with regard to FIG. 4.

Figure 12:
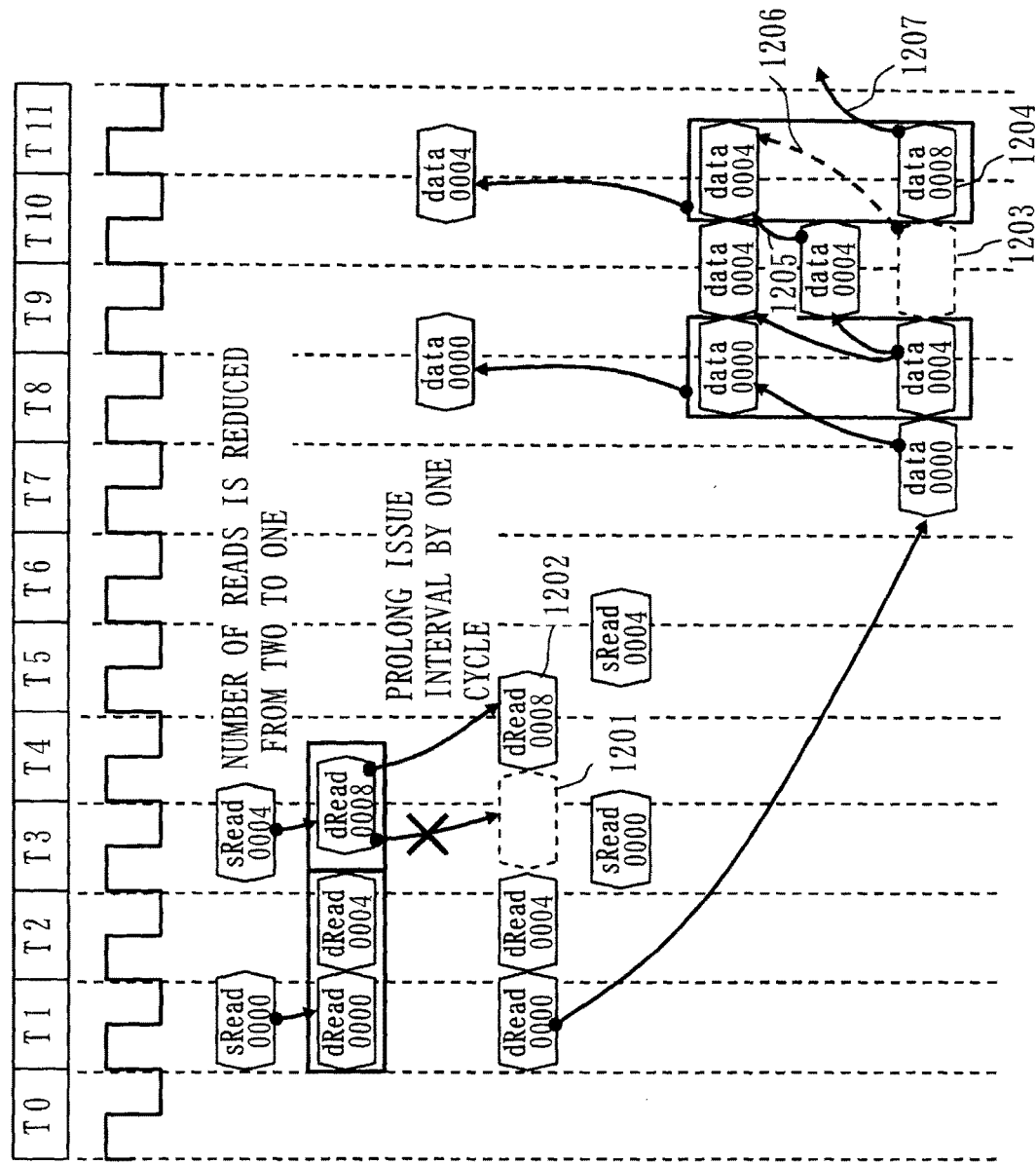
FIG. 12 is a timing chart diagram illustrating an example of the operation of the memory control apparatus according to the second embodiment.

With reference to FIG. 8, FIG. 9, and FIG. 12, the operation of the memory control apparatus 100 according to this embodiment will now be described more specifically.

The operation of the memory control apparatus 100 will be described herein assuming an example where a read request to read 4 bytes from address 0000h (FIG. 1) is accepted from the request source 101 as a first read request, and before the requested payload data is returned in response to the first read request, a read request to read 4 bytes from address 0004h (FIG. 1) is accepted as a second read request.

T1 through T11 of FIG. 12 represent slots in a pipeline process.

Memory CLK represents an operating clock of the request source 101, the memory control apparatus 100, and the memory 105.

In FIG. 12, Command (C1) corresponds to C1 of FIG. 7, Command (C2) corresponds to C2 of FIG. 7, and Command (C3) corresponds to C3 of FIG. 7.

In FIG. 12, Read Data (Out) represents the output of the requested payload data from the ECC correction unit 102 to the request source 101.

In FIG. 12, Read Data (In) represents the input of the read data from the memory 105.

sRead-0000 represents a read request from the request source 101 and represents the read request to read 4 bytes from address 0000h (FIG. 1).

sRead-0004 represents a read request from the request source 101 and represents the read request to read 4 bytes from address 0004h (FIG. 1).

dRead-0000 represents a read command to the memory 105 and represents the read command to read 4 bytes from address 0000h (FIG. 2).

dRead-0004 represents a read command to the memory 105 and represents the read command to read 4 bytes from address 0004h (FIG. 2).

dRead-0008 represents a read command to the memory 105 and represents the read command to read 4 bytes from address 0008h (FIG. 2).

In sections other than Read Data (Out), data-0000 represents the data of address 0000h (FIG. 2) that is read from the memory 105.

In sections other than Read Data (Out), data-0004 represents the data of address 0004h (FIG. 2) that is read from the memory 105.

In sections other than Read Data (Out), data-0008 represents the data of address 0008h (FIG. 2) that is read from the memory 105.

In the Read Data (Out) section, data-0000 represents the requested payload data of address 0000h (FIG. 1) that is outputted to the request source 101.

In the Read Data (Out) section, data-0004 represents the requested payload data of address 0004h (FIG. 1) that is outputted to the request source 101.

First, the memory address conversion unit 106 accepts from the request source 101 a read request to read 4 bytes from address 0000h (FIG. 1) (sRead-0000 of FIG. 12) (S201).

Then, the hit determination unit 113 determines whether a hit for the accepted read request can be found in the data stored in the internal buffer A 109 (S301).

At this point, no data is stored in the internal buffer A 109. Accordingly, a result of determination in S301 is NO.

Then, the memory address conversion unit 106 generates read commands to instruct to read from address 0000h (FIG. 2) and to read from address 0004h (FIG. 2) (dRead-0000 and dRead-0004 of FIG. 12), and outputs the generated read commands to the memory 105 (S202).

Then, the internal buffer management unit 107 checks whether or not succeeding payload data is included in the tail end data (S505). In this case, succeeding payload data is included in the read data from address 0004h (FIG. 2), so that the internal buffer management unit 107 updates the "internal buffer A address" value and the "distance information A" value in the internal buffer information storage unit 112 (S507).

As a result, "0000h" is written in the "internal buffer A address" as illustrated in the "internal buffer A address" section of FIG. 12, and "4" is written in the "distance information A".

The memory address conversion unit 106 stores the read commands (dRead-0000 and dRead-0004 of FIG. 12), the read request (sRead-0004 of FIG. 12), and the memory data input command in the FIFO buffer 110 (S501).

Suppose here that the memory address conversion unit 106 accepts from the request source 101 a read request to read 4 bytes from address 0004h (FIG. 1) (sRead-0004 of FIG. 12) (S201).

As described above, in the process of S507, "address 0000h" is written in the "internal buffer A address" and "4" is written in the "distance information A" in the internal buffer information storage unit 112, and the data of address 0004h (FIG. 2) is going to be cached in the internal buffer A 109. Accordingly, a result of determination in S301 is YES.

Therefore, the memory address conversion unit 106 generates a read command to instruct to read from address 0008h (FIG. 2) (dRead-0008 of FIG. 12) (S302).

Then, the command issue interval control unit 114 outputs the read command (dRead-0008 of FIG. 12) to the memory 105 after an interval of time to allow for use of the data in the internal buffer A 109 (time for avoiding a data collision).

From the timing at which the read request (sRead-0004 of FIG. 12) is inputted from the request source 101, the read command (dRead-0008 of FIG. 12) can be outputted to the memory 105 at the timing of a reference sign 1201 of FIG. 12.

In this embodiment, however, the command issue interval control unit 114 outputs the read command (dRead-0008 of FIG. 12) to the memory 105 at the timing of a reference sign 1202 after delaying the output timing of the read command by one slot from the timing at which the read command can be outputted.

Then, the internal buffer management unit 107 checks whether or not succeeding payload data is included in the tail end data (S505).

In this case, succeeding payload data is included in the read data from address 0008h (FIG. 2), so that the internal buffer management unit 107 updates the "internal buffer A address" value and the "distance information A" value in the internal buffer information storage unit 112 (S507).

As a result, "address 0004h" is written in the "internal buffer A address" as illustrated in the "internal buffer A address" section of FIG. 12, and "4" is written in the "distance information A".

The memory address conversion unit 106 stores the read command (dRead-0008 of FIG. 12), the read request (sRead-0004 of FIG. 12), the memory data input command, and the internal buffer data input command in the FIFO buffer 110 (S501).

In parallel with the above-described operation, the data alignment unit 103 takes out the top read commands (dRead-0000 and dRead-0004 of FIG. 12) and memory data input command from the FIFO buffer 110 (S502 and S503).

In this case, since the internal buffer A 109 is not used, S504 is NO. As illustrated in FIG. 12, the data selection unit 108 receives as input from the memory 105 the data of address 0000h (FIG. 2) (data-0000 of FIG. 12) (S203).

Then, since the inputted data (data-0000 of FIG. 12) is not the tail end data (NO in S400), it is not stored in the internal buffer A 109.

Since data alignment cannot be performed with only the inputted data (data-0000 of FIG. 12) (NO in S305), an input of the next data from the memory 105 is awaited.

At this time, the data of address 0000h (FIG. 2) (data-0000 of FIG. 12) is held in the last time value holding unit 104.

Then, the data selection unit 108 receives as input from the memory 105 the data of address 0004h (FIG. 2) (data-0004 of FIG. 12) (S203).

Since the inputted data (data-0004 of FIG. 12) is the tail end data (YES in S400) and includes succeeding payload data (YES in S401), the inputted data is stored in the internal buffer A 109.

Since data alignment can be performed with the inputted data (data-0004 of FIG. 12) and the data in the last time value holding unit 104 (data-0000 of FIG. 12) (YES in S305), the data alignment unit 103 aligns the data, and the ECC correction unit 102 performs ECC correction and outputs the ECC-corrected requested payload data (data-0000 of FIG. 12) to the request source 101 (S205 and S206).

The data of address 0004h (FIG. 2) (data-0004 of FIG. 12) is held in the last time value holding unit 104.

The data alignment unit 103 takes out from the FIFO buffer the next read command (dRead-0008 of FIG. 12), internal buffer data input command, and memory data input command (S502 and S503).

In this case, since the internal buffer A 109 is used, S504 is YES and the data in the internal buffer A 109 (data-0004 of FIG. 12) is outputted to the data alignment unit 103 (S303).

Since data alignment cannot be performed with the data from the internal buffer A 109 (data-0004 of FIG. 12) and the data in the last time value holding unit 104 (data-0004 of FIG. 12) (NO in S305), an input of the next data from the memory 105 is awaited.

At this time, the data from the internal buffer A 109 (data-0004 of FIG. 12) is held in the last time value holding unit 104.

Then, the data selection unit 108 receives as input from the memory 105 the data of address 0008h (FIG. 2) (data-0008 of FIG. 12) (S203).

If dRead-0008 is outputted from the command issue interval control unit 114 to the memory 105 at the timing of the reference sign 1201, data-0008 is inputted from the memory 105 at the timing of a reference sign 1203. As described above, however, dRead-0008 is outputted at the timing of the reference sign 1202. Thus, data-0008 is inputted from the memory 105 at the timing of a reference sign 1204.

Since the inputted data (data-0008 of FIG. 12) is the tail end data (YES in S400) and includes succeeding payload data (YES in S401), the inputted data is stored in the internal buffer A 109.

Since data alignment can be performed with the inputted data (data-0008 of FIG. 12) and the data in the last time value holding unit 104 (data-0004 of FIG. 12) (YES in S305), the data alignment unit 103 aligns the data, and the ECC correction unit 102 performs ECC correction and outputs the ECC-corrected requested payload data (data-0004 of FIG. 12) to the request source 101 (S205 and S206).

The data of address 0008h (FIG. 2) (data-0004 of FIG. 12) is held in the last time value holding unit 104.

In the example of FIG. 12, if the output timing of dRead-0008 is not adjusted by the command issue interval control unit 114 and dRead-0008 is outputted at the timing of the reference sign 1201, data-0008 is inputted from the memory 105 at the timing of the reference sign 1203.

In this case, data-0008 is inputted to the last time value holding unit 104 at the timing of a reference sign 1206. This collides with the timing at which data-0004 in the internal buffer A 109 is inputted to the last time value holding unit 104 as indicated by a reference sign 1205.

As a result, either data-0008 or data-0004 will be lost.

In contrast, according to this embodiment, the command issue interval control unit 114 outputs dRead-0008 at the timing of the reference sign 1202, so that data-0008 is inputted from the memory 105 at the timing of the reference sign 1204.

If inputted at the timing of the reference sign 1204, data-0008 is inputted to the last time value holding unit 104 at the timing of a reference sign 1207 and no data collision occurs.

Figure 13:
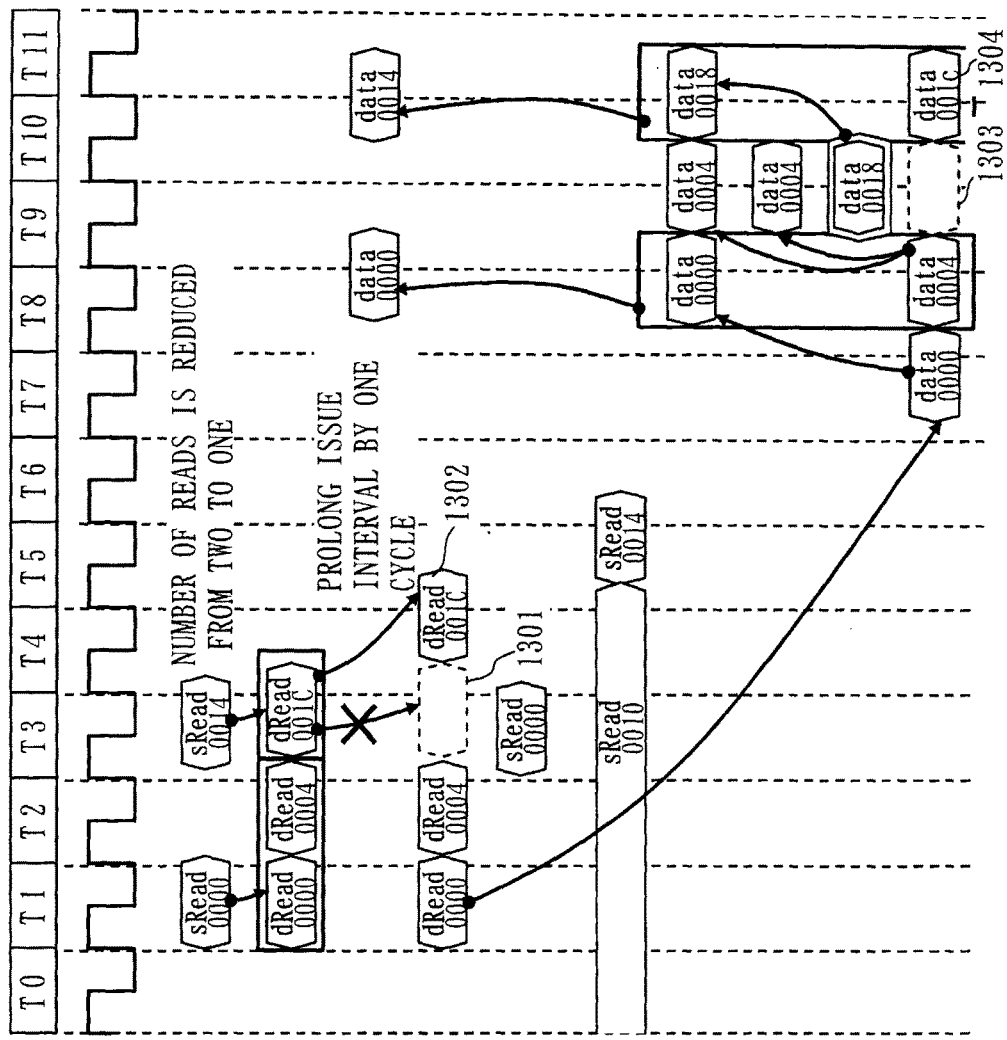
FIG. 13 is a timing chart diagram illustrating an example of the operation of the memory control apparatus according to the second embodiment.

With reference to FIG. 8, FIG. 9 and FIG. 13, an example of the operation of the memory control apparatus 100 including the internal buffer B 1090 in addition to the internal buffer A 109 will now be described.

The operation of the memory control apparatus 100 will be described here assuming an example where a read request to read 4 bytes from address 0000h (FIG. 1) is accepted from the request source 101 as a first read request, and before the requested payload data is returned in response to the first read request, a read request to read 4 bytes from address 0014h (FIG. 1) is accepted as a second read request.

As illustrated in "internal buffer B address" and "internal buffer B" of FIG. 13, it is assumed that the data of address 0018h (FIG. 2) (data-0018 of FIG. 13) has been stored in the internal buffer B 1090 by a previous read request for address 0010h (FIG. 1).

In FIG. 13, data-0018 is represented with double lines in order to indicate that data-0018 is being held continuously in the internal buffer B 1090.

First, the memory address conversion unit 106 accepts from the request source 101 a read request to read 4 bytes from address 0000h (FIG. 1) (sRead-0000 of FIG. 13) (S201).

Then, the hit determination unit 113 determines whether a hit for the accepted read request can be found in the data stored in the internal buffer A 109 or the internal buffer B 1090 (S301).

At this point, no data is stored in the internal buffer A 109 and the data in the internal buffer B 1090 does not match the address requested by the read request. Accordingly, a result of determination in S301 is NO.

Then, the memory address conversion unit 106 generates read commands to instruct to read from address 0000h (FIG. 2) and to read from address 0004h (FIG. 2) (dRead-0000 and dRead-0004 of FIG. 13) and outputs the generated read commands to the memory 105 (S202).

Then, the internal buffer management unit 107 checks whether or not succeeding payload data is included in the tail end data (S505). In this case, since succeeding payload data is included in the read data from address 0004h (FIG. 2), the internal buffer management unit 107 updates the "internal buffer A address" value and the "distance information A" value in the internal buffer information storage unit 112 (S507).

As a result, "address 0000h" is written in the "internal buffer A address" as illustrated in the "internal buffer A address" section of FIG. 13, and "4" is written in the "distance information A".

The memory address conversion unit 106 stores the read command (dRead-0000 and dRead-0004 of FIG. 13) and the memory data input command in the FIFO buffer 110 (S501).

Suppose here that the memory address conversion unit 106 accepts from the request source 101 a read request to read 4 bytes from address 0014h (FIG. 1) (sRead-0014 of FIG. 13) (S201).

As described above, out of the data of address 0018h (FIG. 2) and the data of address 001Ch (FIG. 2) corresponding to address 0014h (FIG. 1), the data of address 0018h (FIG. 2) (data-0018 of FIG. 13) has been cached in the internal buffer B 1090. Accordingly, S301 is determined as YES.

Therefore, the memory address conversion unit 106 generates a read command to instruct to read from address 001Ch (FIG. 2) (dRead-001C of FIG. 13) (S302).

Then, the command issue interval control unit 114 outputs the read command (dRead-001C of FIG. 13) to the memory 105 after an interval of time to allow for use of the data in the internal buffer B 1090 (time for avoiding a data collision).

From the timing at which the read request (sRead-0014 of FIG. 13) is inputted from the request source 101, the read command (dRead-001C of FIG. 13) is outputted to the memory 105 at the timing of a reference sign 1301.

In this embodiment, however, the command issue interval control unit 114 outputs the read command (dRead-001C of FIG. 13) to the memory 105 at the timing of a reference sign 1302 by delaying the output timing of the read command by one slot from the timing at which the read command can be outputted.

Then, the internal buffer management unit 107 checks whether or not succeeding payload data is included in the tail end data (S505). In this case, since succeeding payload data is included in the read data from address 001Ch (FIG. 2), the internal buffer management unit 107 updates the "internal buffer B address" value and the "distance information B" value in the internal buffer information storage unit 112 (S507).

As a result, "address 0014h" is written in the "internal buffer B address" as illustrated in the "internal buffer B address" section of FIG. 13, and "4" is written in the "distance information B".

The memory address conversion unit 106 stores the read command (dRead-0000 and dRead-0004 of FIG. 13) and the memory data input command in the FIFO buffer 110 (S501).

In this example, the internal buffer data input command instructs to input the data in the internal buffer B 1090.

On the other hand, when the data in the internal buffer A 109 is used, the internal buffer data input command instructs to input the data in the internal buffer A 109.

In parallel with the above-described operation, the data alignment unit 103 takes out the top read commands (dRead-0000 and dRead-0004 of FIG. 13) and memory data input command from the FIFO buffer 110 (S502 and S503).

In this case, since the internal buffer A 109 is not used, S504 is NO and the data selection unit 108 receives as input from the memory 105 the data of address 0000h (FIG. 2) (data-0000 of FIG. 13), as illustrated in FIG. 13.

Then, since the inputted data (data-0000 of FIG. 13) is not the tail end data (NO in S400), it is not stored in the internal buffer A 109.

Since data alignment cannot be performed with only the inputted data (data-0000 of FIG. 13) (NO in S305), an input of the next data from the memory 105 is awaited.

At this time, the data of address 0000h (FIG. 2) (data-0000 of FIG. 13) is held in the last time value holding unit 104.

Then, the data selection unit 108 receives as input from the memory 105 the data of address 0004h (FIG. 2) (data-0004 of FIG. 13) (S203).

Since the inputted data (data-0004 of FIG. 13) is the tail end data (YES in S400) and includes succeeding payload data (YES in S401), the inputted data is stored in the internal buffer A 109.

Since data alignment can be performed with the inputted data (data-0004 of FIG. 13) and the data in the last time value holding unit 104 (data-0000 of FIG. 13) (YES in S305), the data alignment unit 103 aligns the data, and the ECC correction unit 102 performs ECC correction and outputs the ECC-corrected requested payload data (data-0000 of FIG. 13) to the request source 101 (S205 and S206).

The data of address 0004h (FIG. 2) (data-0004 of FIG. 13) is held in the last time value holding unit 104.

The data alignment unit 103 takes out the next read command (dRead-001C of FIG. 13), internal buffer data input command, and memory data input command from the FIFO buffer 110 (S502 and S503).

In this case, since the internal buffer B 1090 is used, S504 is YES and the data in the internal buffer B 1090 (data-0018 of FIG. 13) is outputted to the data alignment unit 103 (S303).

Since data alignment cannot be performed with the data from the internal buffer B 1090 (data-0018 of FIG. 13) and the data in the last time value holding unit 104 (data-0004 of FIG. 13) (NO in S305), an input of the next data from the memory 105 is awaited.

At this time, the data from the internal buffer A 109 (data-0018 of FIG. 13) is held in the last time value holding unit 104.

Then, the data selection unit 108 receives as input from the memory 105 the data of address 001Ch (FIG. 2) (data-001C of FIG. 13) (S203).

If dRead-001C is outputted from the command issue interval control unit 114 to the memory 105 at the timing of the reference sign 1301, data-001C is inputted from the memory 105 at the timing of a reference sign 1303. As described above, however, because dRead-001C is outputted at the timing of the reference sign 1302, data-001C is inputted from the memory 105 at the timing of a reference sign 1304.

Since the inputted data (data-001C of FIG. 13) is the tail end data (YES in S400) and includes succeeding payload data (YES in S401), the inputted data is stored in the internal buffer B 1090.

Since data alignment can be performed with the inputted data (data-001C of FIG. 13) and the data in the last time value holding unit 104 (data-0018 of FIG. 13) (YES in S305), the data alignment unit 103 aligns the data, and the ECC correction unit 102 performs ECC correction and outputs the ECC-corrected requested payload data (data-0014 of FIG. 13) to the request source 101 (S205 and S206).

The data of address 001Ch (FIG. 2) (data-001C of FIG. 13) is held in the last time value holding unit 104.

It has been described above that data of one address (4-byte data) is stored in the internal buffer A 109 and the internal buffer B 1090. Data of two or more addresses may be stored in the internal buffer A 109 and the internal buffer B 1090.

In a case where converting an address in the format of FIG. 1 specified by a read request from the request source 101 into an address in the format of FIG. 2 results in three or more read out candidate addresses, and the data of the first two addresses of the three or more read out candidate addresses has been cached in the internal buffer A 109 or the internal buffer B 1090, the memory address conversion unit 106 generates a read command (partial read command) to instruct to read the data of an address or addresses other than the first two addresses, i.e., the data of the third address or the third and later addresses.

It has been described above that the command issue interval control unit 114 outputs a partial read command generated by the memory address conversion unit 106 to the memory 105 by delaying the output timing of the partial read command by one slot.

In contrast, a collision between the read data from the memory 105 and the data from the internal buffer A 109 may be avoided by arranging that the memory address conversion unit 106 generates a partial read command by delaying the generation timing by one slot from the regular generation timing.

The memory control apparatus 100 according to this embodiment is also capable of handling read requests in units of an integral multiple of 4 bytes, as in the case of the first embodiment.

The procedure described in this embodiment can also deal with a case where three or more internal buffers are employed.

In this embodiment, a memory control apparatus supporting a pipelined memory and having the following means has been described:

(a) means to store a request issued to a memory; and (b) means to control a command issue interval in order to delay issuing of the next command to be issued to the memory.

Third Embodiment

In the second embodiment, when the data in the internal buffer A 109 is used, the issue interval of read commands to the memory 105 is unconditionally prolonged. However, at the time when a read request from the request source 101 is accepted, if there is time to allow for use of the internal buffer A 109, i.e., if no data collision is expected to occur, it is not necessary to prolong the issue interval of read commands.

In this embodiment, a method will be described by which read commands are issued with economy by controlling to prolong the command issue interval only when it is detected that there is not sufficient time to allow for use of the internal buffer A 109.

Figure 10:
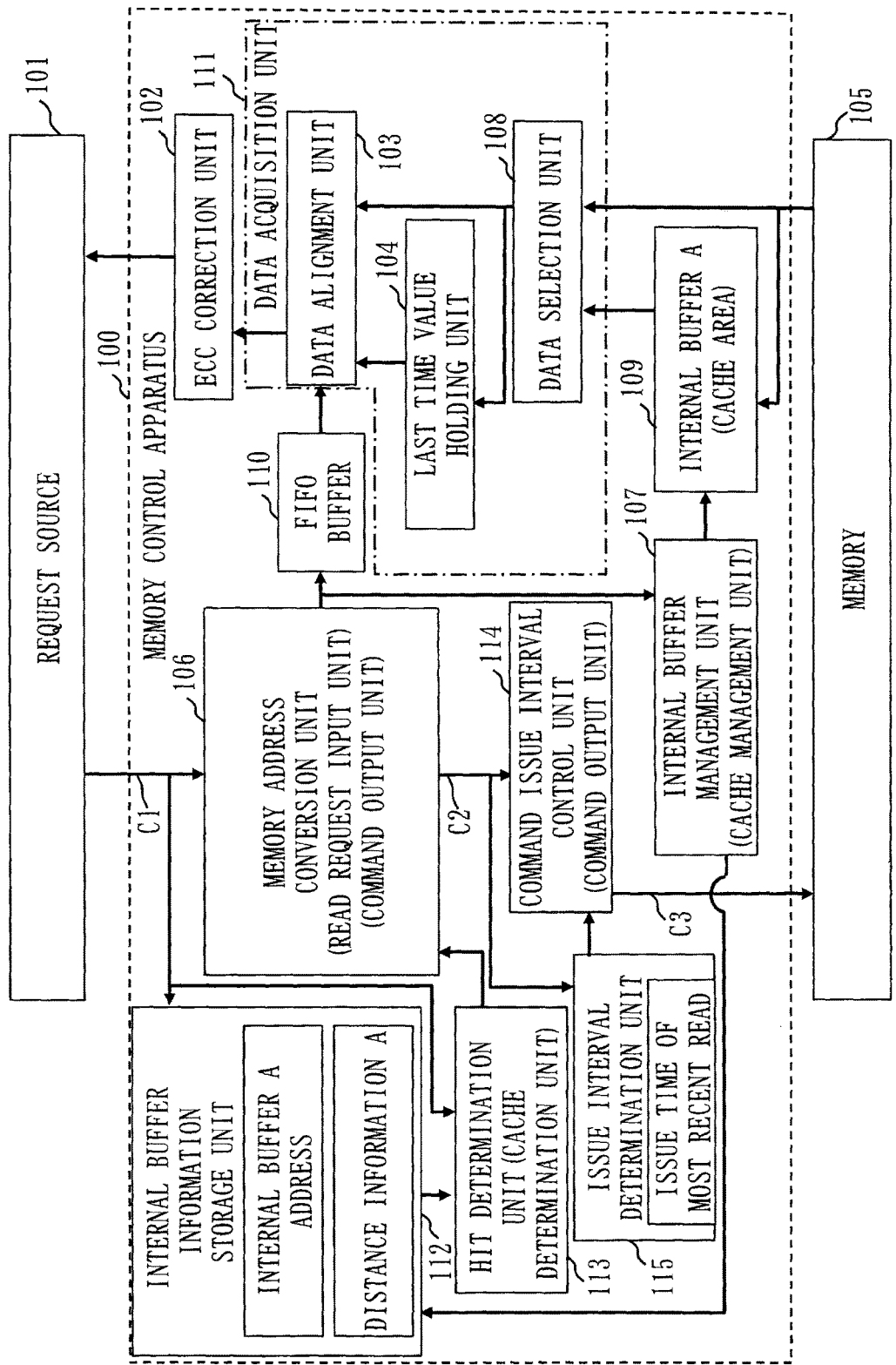
FIG. 10 is a diagram illustrating a memory control apparatus, a request source, and a memory according to a third embodiment.

FIG. 10 illustrates an example of the configuration of the memory control apparatus 100 according to this embodiment.

Compared with FIG. 7, an issue interval determination unit 115 is added in FIG. 10.

The issue interval determination unit 115 determines whether there is an issue interval of a predetermined period or longer between a partial read command currently to be issued to the memory 105 and a read command (an entire area read command or a partial read command) issued immediately before this partial read command.

Specifically, the issue interval determination unit 115 determines whether an elapsed time after the issuing of the last read command (a partial read command or an entire area read command) exceeds the issue interval (delay time) described in the second embodiment.

If the elapsed time after the output of the last read command exceeds the issue interval (delay time) described in the second embodiment, the command issue interval control unit 114 outputs the partial read command to the memory 105 without any interval.

The issue interval determination unit 115 holds the time at which the last read command is outputted as an issue time of the most recent read, and determines whether a difference between the issue time of the most recent read and the current time exceeds the issue interval (delay time) described in the second embodiment.

In this embodiment, the issue interval determination unit 115 also corresponds to an example of the command output unit.

Figure 11:
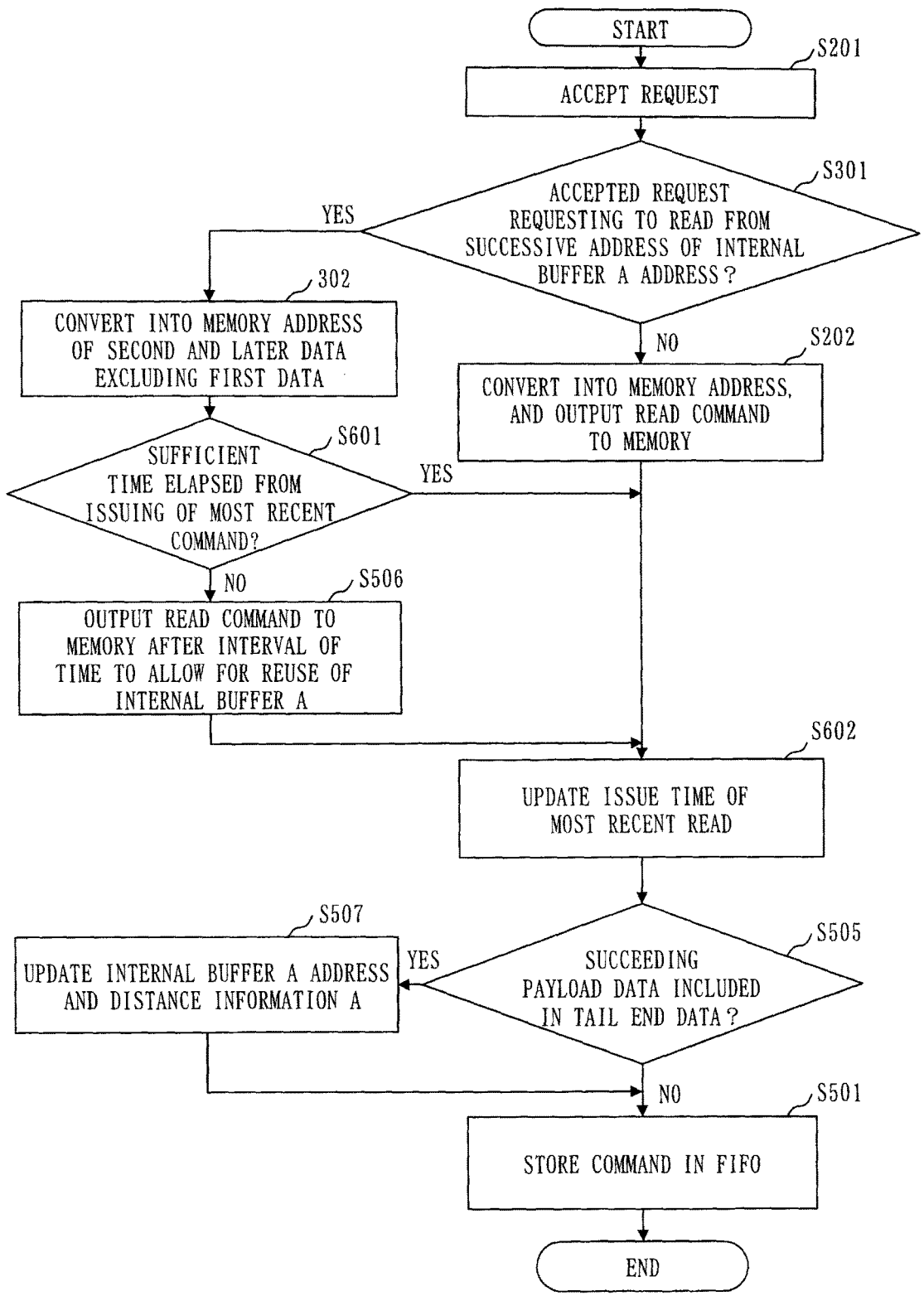
FIG. 11 is a flowchart illustrating an example of the operation of the memory control apparatus according to the third embodiment.

The operation of the memory control apparatus 100 according to this embodiment will now be described with reference to FIG. 11 and FIG. 14.

Differences from the second embodiment will be mainly described hereinafter.

The operation of the memory control apparatus 100 will be described hereinafter assuming an example where a read request to read 4 bytes from address 0000h (FIG. 1) is accepted from the request source 101 as a first read request, and before the requested payload data is returned in response to the first read request, a read request to read 4 bytes from address 0004h (FIG. 1) is accepted as a second read request.

First, the memory address conversion unit 106 receives as input a read request to read 4 bytes from address 0000h (FIG. 1) (sRead-0000 of FIG. 14), and as described in the second embodiment, generates an entire area read command to instruct to read 8 bytes from address 0000h (FIG. 2). The command issue interval control unit 114 outputs this entire area read command to the memory 105 (S201, S301, and S202).

When outputting the read command, the command issue interval control unit 114 notifies the issue interval determination unit 115 of the output of the read command. The issue interval determination unit 115 updates the issue time of the most recent read with the time at which the output of the read command is notified from the command issue interval control unit 114 (S602).

The process to be performed from this point onward is substantially the same as that of the second embodiment.

Then, the memory address conversion unit 106 receives as input a read request to read 4 bytes from address 0004h (FIG. 1) (sRead-0004 of FIG. 14) (S201).

Since the data in the internal buffer A 109 can be used here, a hit is determined and S301 is YES. As in the case of the second embodiment, the memory address conversion unit 106 generates a partial read command (dRead-0008 of FIG. 14) (S302).

Then, the issue interval determination unit 115 determines whether or not the elapsed time after the output of the last read command (dRead-0004 of FIG. 14) exceeds the delay time (in the example of FIG. 14, time corresponding to one slot) (S601).

Figure 14:
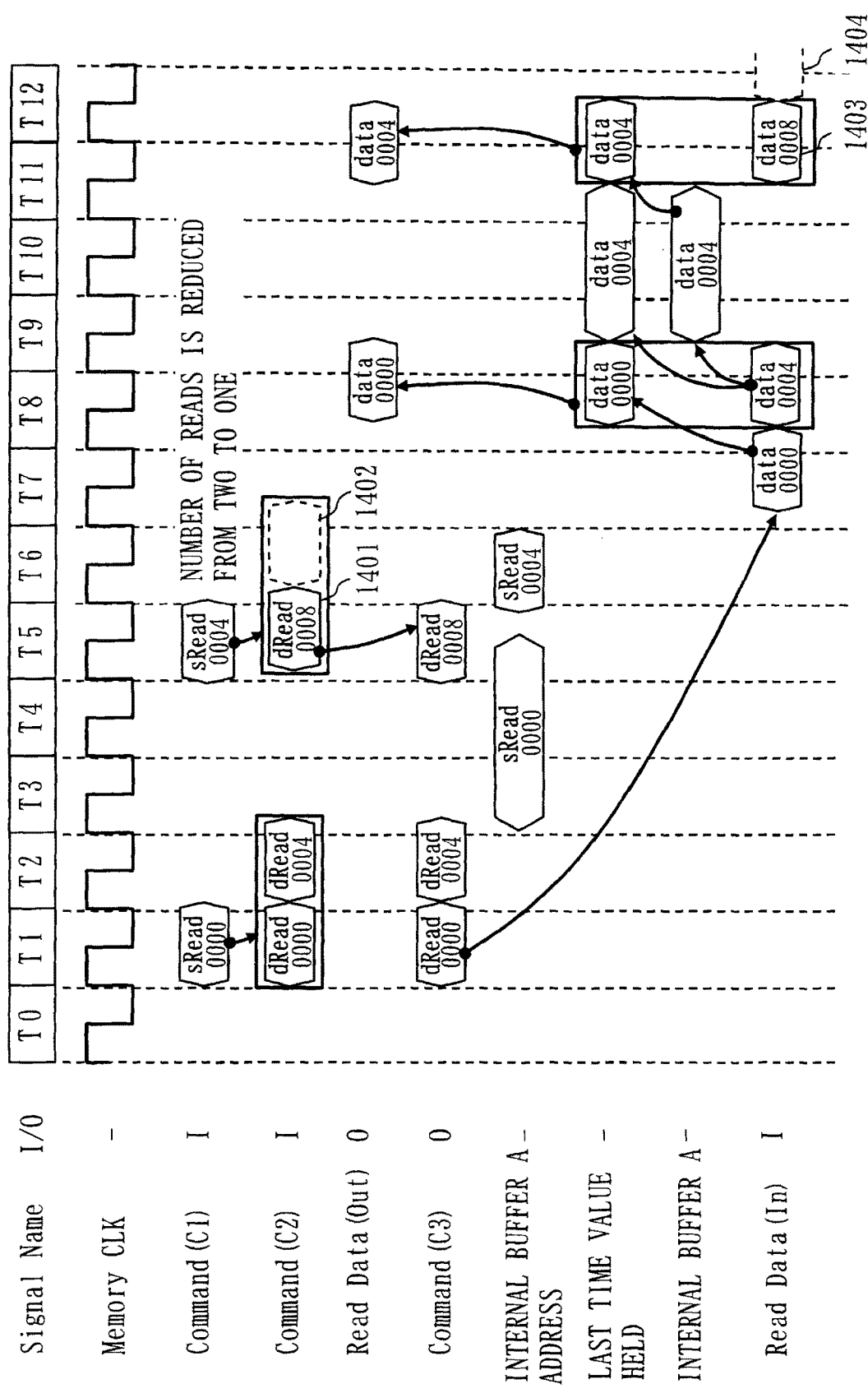
FIG. 14 is a timing chart diagram illustrating an example of the operation of the memory control apparatus according to the third embodiment.

In the example of FIG. 14, the elapsed time after the output of the last read command exceeds the delay time (YES in S601), so that the command issue interval control unit 114 outputs the read command (dRead-0008 of FIG. 14) to the memory 105 without any issue interval (without waiting for the delay time to elapse).

In the second embodiment, the read command (dRead-0008) is outputted to the memory 105 at the timing of a reference sign 1402. In this embodiment, the read command (dRead-0008) is outputted to the memory 105 at the timing of a reference sign 1401.

As a result, the read data (data-0008) is inputted from the memory 105 at the timing of a reference sign 1403.

On the other hand, in the second embodiment, the read data (data-0008) is inputted at the timing of a reference sign 1404.

On the other hand, if the elapsed time after the output of the last read command does not exceed the delay time (NO in S601), the command issue interval control unit 114 outputs the read command (dRead-0008 of FIG. 14) to the memory 105 (S506) after the delay time has elapsed from the timing at which the read command can be outputted to the memory 105, as in the case of the second embodiment.

The process from that point onward is the same as that in the second embodiment, and thus description thereof will be omitted.

It has been described above that if the elapsed time after the output of the last read command does not exceed the delay time, the command issue interval control unit 114 outputs the read command to the memory 105 after the delay time has elapsed from the timing at which the read command can be outputted.

In contrast, it may be arranged that if the elapsed time after the output of the last read command does not exceed the delay time, the command issue interval control unit 114 calculates a time difference between the delay time and the elapsed time after the output of the last read command, and outputs the read command to the memory 105 after the time difference has elapsed from the timing at which the read command can be outputted.

In this embodiment, a memory control apparatus having the following means has been described, wherein issuing of a command is not delayed if there is sufficient time to allow for reuse of data in an internal buffer:

(a) means to determine whether an issue interval from a read command issued most recently exceeds time to allow for reuse of the data in the internal buffer; and (b) means to hold the timing of the read command issued most recently.

The embodiments of the present invention have been described. Two or more of these embodiments may be implemented in combination.

Alternatively, one of these embodiments may be implemented partially.

Alternatively, two or more of these embodiments may be implemented partially in combination.

The present invention is not limited to these embodiments and various modifications are possible as appropriate.

REFERENCE SIGNS LIST

100: memory control apparatus, 101: request source, 102: ECC correction unit, 103: data alignment unit, 104: last time value holding unit, 105: memory, 106: memory address conversion unit, 107: internal buffer management unit, 108: data selection unit, 109: internal buffer A, 110: FIFO buffer, 111: data acquisition unit, 112: internal buffer information storage unit, 113: hit determination unit, 114: command issue interval control unit, 115: issue interval determination unit, 1090: internal buffer B

The invention claimed is:

1. A memory control apparatus that processes with a pipeline method a read request for requesting to read out payload data from a memory having a plurality of addresses each storing data of a predetermined data width, the memory in which error correcting data is set for each payload data of the data width, payload data of the data width and the error correcting data being correlated with each other are stored across two adjacent addresses, and the data is read out in address units, the memory control apparatus comprising:

a cache area in which the data that has been read out from the memory is cached;

a read request input unit that receives as input a read request for requesting to read out the payload data of an integral multiple of the data width;

a cache determination unit that determines whether or not data of any one of two or more read out candidate addresses has been cached or is going to be cached in the cache area, the two or more read out candidate addresses being addresses in which are stored requested payload data which is payload data being requested by the read request received as input by the read request input unit, and corresponding error correcting data which is error correcting data used for error correction of the requested payload data; and a command output unit that, when the cache determination unit determines that data of any one of the two or more read out candidate addresses has been cached or is going to be cached in the cache area, outputs to the memory a partial read command to instruct to read out data from an address other than a cache address, after a predetermined delay time has elapsed from timing at which the partial read command can be outputted to the memory, the cache address being an address of the data that has been cached or is going to be cached in the cache area out of the two or more read out candidate addresses.

2. The memory control apparatus according to claim 1, wherein when the cache determination unit determines that data of a leading address out of the two or more read out candidate addresses and data of zero or more addresses that follow the leading address have been cached or are going to be cached in the cache area, the command output unit outputs to the memory the partial read command to instruct to read out data of an address other than the cache address which includes the leading address.

3. The memory control apparatus according to claim 2, further comprising:

a FIFO (First In First Out) buffer in which commands are accumulated; and a data acquisition unit that receives as input a command from the FIFO buffer, and obtains the requested payload data and the corresponding error correcting data according to the command received as input, wherein the command output unit outputs the partial read command to the memory, and stores in the FIFO buffer a cache data input command to instruct the data acquisition unit to receive as input from the cache area the data of the cache address, and a memory data input command to instruct the data acquisition unit to receive as input from the memory the data of the address other than the cache address, and wherein the data acquisition unit receives as input from the FIFO buffer the cache data input command and the memory data input command, and according to the cache data input command, receives as input from the cache area the data of the cache address, and according to the memory data input command, receives as input from the memory the data of the address other than the cache address that is read out in response to the partial read command, and obtains the requested payload data and the corresponding error correcting data from the data of the cache address received as input from the cache area and the data of the address other than the cache address received as input from the memory.

4. The memory control apparatus according to claim 3, wherein the command output unit outputs the partial read command to the memory after the delay time has elapsed, so as to prevent an occurrence of a collision in the data acquisition unit between an input of the data of the cache address from the cache area and an input of the data of the address other than the cache address from the memory.

5. The memory control apparatus according to claim 1, wherein when the cache determination unit determines that data of any one of the two or more read out candidate addresses has not been cached and is not going to be cached in the cache area, the command output unit outputs to the memory an entire area read command to instruct to read out data from an entire area of the two or more read out candidate addresses without waiting for the delay time to elapse.

6. The memory control apparatus according to claim 5, wherein when outputting the partial read command to the memory, the command output unit determines whether or not an elapsed time from when either of a last entire area read command and a last partial read command is outputted to the memory exceeds the delay time, and when the elapsed time from when either of the last entire area read command and the last partial read command is outputted to the memory exceeds the delay time, the command output unit outputs the partial read command to the memory without waiting for the delay time to elapse.

7. The memory control apparatus according to claim 6,
wherein when the elapsed time from when either of the
last entire area read command and the last partial read
command is outputted to the memory does not exceed
the delay time,
the command output unit calculates a time difference
between the delay time and the elapsed time from when
either of the last entire area read command and the last
partial read command is outputted to the memory, and
outputs the partial read command to the memory after the
time difference has elapsed from the timing at which
the partial read command can be outputted to the
memory.

8. The memory control apparatus according to claim 5,
further comprising
a cache management unit that, when data which is neither
the requested payload data nor the corresponding error
correcting data is included in tail end data which is data
at a tail end that is read out from the memory in
response to either of the entire area read command and
the partial read command outputted by the command
output unit, stores the tail end data in the cache area.

9. The memory control apparatus according to claim 1,
wherein the command output unit uses a time corresponding to at least one slot in a pipeline process as the delay time.

10. The memory control apparatus according to claim 1,
further comprising
a plurality of cache areas,
wherein the cache determination unit determines whether
or not data of any one of the two or more read out
candidate addresses has been cached or is going to be
cached in any one of the plurality of cache areas.

11. A memory control apparatus that processes with a
pipeline method a read request for requesting to read out
payload data from a memory having a plurality of addresses
each storing data of a predetermined data width, the memory
in which error correcting data is set for each payload data of
the data width, payload data of the data width and the error
correcting data being correlated with each other are stored
across two adjacent addresses, and the data is read out in
address units, the memory control apparatus comprising:
a cache area in which the data that has been read out from
the memory is cached;
a circuit or programmed processor configured to perform
the function of a read request input unit that receives as
input a read request for requesting to read out the
payload data of an integral multiple of the data width;
a circuit or the programmed processor configured to
perform the function of a cache determination unit that
determines whether or not data of any one of two or
more read out candidate addresses has been cached or
is going to be cached in the cache area, the two or more
read out candidate addresses being addresses in which
are stored requested payload data which is payload data
being requested by the read request received as input by
the read request input unit, and corresponding error
correcting data which is error correcting data used for
error correction of the requested payload data; and
a circuit or the programmed processor configured to
perform the function of a command output unit that,
when the cache determination unit determines that data
of any one of the two or more read out candidate
addresses has been cached or is going to be cached in
the cache area, outputs to the memory a partial read
command to instruct to read out data from an address
other than a cache address, after a predetermined delay
time has elapsed from timing at which the partial read
command can be outputted to the memory, the cache
address being an address of the data that has been
cached or is going to be cached in the cache area out of
the two or more read out candidate addresses.

12. The memory control apparatus according to claim 11,
wherein when the cache determination unit determines
that data of a leading address out of the two or more
read out candidate addresses and data of zero or more
addresses that follow the leading address have been
cached or are going to be cached in the cache area, the
command output unit outputs to the memory the partial
read command to instruct to read out data of an address
other than the cache address which includes the leading
address.

13. The memory control apparatus according to claim 12,
further comprising:
a FIFO (First In First Out) buffer in which commands are
accumulated; and
a circuit or the programmed processor configured to
perform the function of a data acquisition unit that
receives as input a command from the FIFO buffer, and
obtains the requested payload data and the corresponding error correcting data according to the command
received as input,
wherein the command output unit outputs the partial read
command to the memory, and
stores in the FIFO buffer a cache data input command to
instruct the data acquisition unit to receive as input
from the cache area the data of the cache address, and
a memory data input command to instruct the data
acquisition unit to receive as input from the memory
the data of the address other than the cache address, and
wherein the data acquisition unit receives as input from
the FIFO buffer the cache data input command and the
memory data input command, and according to the
cache data input command, receives as input from the
cache area the data of the cache address, and according
to the memory data input command, receives as input
from the memory the data of the address other than the
cache address that is read out in response to the partial
read command, and
obtains the requested payload data and the corresponding
error correcting data from the data of the cache address
received as input from the cache area and the data of the
address other than the cache address received as input
from the memory.

14. The memory control apparatus according to claim 13,
wherein
the command output unit outputs the partial read command to the memory after the delay time has elapsed,
so as to prevent an occurrence of a collision in the data
acquisition unit between an input of the data of the
cache address from the cache area and an input of the
data of the address other than the cache address from
the memory.

15. The memory control apparatus according to claim 11,
wherein when the cache determination unit determines
that data of any one of the two or more read out
candidate addresses has not been cached and is not
going to be cached in the cache area, the command
output unit outputs to the memory an entire area read
command to instruct to read out data from an entire area
of the two or more read out candidate addresses without
waiting for the delay time to elapse.

16. The memory control apparatus according to claim 15, wherein when outputting the partial read command to the memory, the command output unit determines whether or not an elapsed time from when either of a last entire area read command and a last partial read command is outputted to the memory exceeds the delay time, and
when the elapsed time from when either of the last entire area read command and the last partial read command is outputted to the memory exceeds the delay time, the command output unit outputs the partial read command to the memory without waiting for the delay time to elapse.

17. The memory control apparatus according to claim 16, wherein when the elapsed time from when either of the last entire area read command and the last partial read command is outputted to the memory does not exceed the delay time,
the command output unit calculates a time difference between the delay time and the elapsed time from when either of the last entire area read command and the last partial read command is outputted to the memory, and
outputs the partial read command to the memory after the time difference has elapsed from the timing at which the partial read command can be outputted to the memory.

18. The memory control apparatus according to claim 15, further comprising
a circuit or the programmed processor configured to perform the function of a cache management unit that, when data which is neither the requested payload data nor the corresponding error correcting data is included in tail end data which is data at a tail end that is read out from the memory in response to either of the entire area read command and the partial read command outputted by the command output unit, stores the tail end data in the cache area.

19. The memory control apparatus according to claim 11, wherein the command output unit uses a time corresponding to at least one slot in a pipeline process as the delay time.

20. The memory control apparatus according to claim 11, further comprising
a plurality of cache areas,
wherein the cache determination unit determines whether or not data of any one of the two or more read out candidate addresses has been cached or is going to be cached in any one of the plurality of cache areas.

* * * * *